US007804400B2

(12) United States Patent
Muirhead

(10) Patent No.: US 7,804,400 B2
(45) Date of Patent: *Sep. 28, 2010

(54) THERMOFORMED PLATFORM HAVING A COMMUNICATIONS DEVICE

(75) Inventor: Scott Arthur William Muirhead, Surrey (CA)

(73) Assignee: Nextreme, LLC, Lemont Furnace, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/476,434

(22) Filed: Jun. 28, 2006

(65) Prior Publication Data

US 2006/0243174 A1 Nov. 2, 2006

Related U.S. Application Data

(63) Continuation of application No. 11/102,221, filed on Apr. 8, 2005, which is a continuation of application No. 09/770,097, filed on Jan. 24, 2001, now Pat. No. 6,943,678.

(60) Provisional application No. 60/177,383, filed on Jan. 24, 2000.

(51) Int. Cl.
*B65D 19/38* (2006.01)
*G08B 26/00* (2006.01)
(52) U.S. Cl. ............... 340/505; 108/57.25; 108/901
(58) Field of Classification Search ............ 108/51.11, 108/57.25, 901, 902; 340/572.1, 825.49, 340/825.36, 505; 705/28; 700/1; 425/135, 425/137, 169
See application file for complete search history.

(56) References Cited

U.S. PATENT DOCUMENTS

| 3,398,434 A | 8/1968 | Alesi, Jr. et al. ............. 425/504 |
| 3,583,036 A | 6/1971 | Brown ........................ 425/185 |
| 3,597,799 A | 8/1971 | Earle .......................... 425/174 |
| 3,695,188 A | 10/1972 | Granastein ............... 108/57.28 |
| 3,702,100 A | 11/1972 | Wharton .................... 108/53.3 |
| 3,779,687 A | 12/1973 | Alesi .......................... 425/383 |
| 3,783,078 A | 1/1974 | Brodhead ................... 156/499 |
| 3,787,158 A | 1/1974 | Brown et al. ................ 425/156 |
| 3,867,088 A | 2/1975 | Brown et al. ................ 425/504 |
| 3,868,209 A | 2/1975 | Howell ....................... 425/504 |
| 3,919,382 A | 11/1975 | Smarook .................... 264/164 |
| 3,919,445 A | 11/1975 | Smarook .................... 428/116 |
| 3,919,446 A | 11/1975 | Smarook .................... 428/116 |
| 3,964,400 A | 6/1976 | Brand ..................... 108/57.25 |
| 4,013,021 A | 3/1977 | Steinlein et al. .......... 108/57.25 |

(Continued)

FOREIGN PATENT DOCUMENTS

WO    WO00/45324    8/2000

*Primary Examiner*—José V Chen
(74) *Attorney, Agent, or Firm*—Price & Adams

(57) ABSTRACT

An apparatus has a communications device associated therewith. In another aspect of the present invention, a pallet is made from thermoformed polymeric sheets with an attached communications device. A further aspect of the present invention provides a radio frequency identification device attached to an apparatus. In still another aspect of the present invention, a communications device is incorporated into one or more sheets of a pallet or other container prior to forming. Methods of making and using a thermoformed pallet and container, having a communications device, are also provided.

36 Claims, 12 Drawing Sheets

U.S. PATENT DOCUMENTS

| | | | | |
|---|---|---|---|---|
| 4,070,839 A | 1/1978 | Clem | | 52/448 |
| 4,079,232 A | 3/1978 | Brokoff et al. | | 219/154 |
| 4,101,252 A | 7/1978 | Brown | | 425/394 |
| 4,113,909 A | 9/1978 | Beasley | | 428/116 |
| 4,133,270 A | 1/1979 | Ravera | | 108/57.25 |
| 4,158,539 A | 6/1979 | Arends et al. | | 425/451.4 |
| 4,164,387 A | 8/1979 | Schermutzki et al. | | 425/371 |
| 4,164,389 A | 8/1979 | Beasley | | 425/406 |
| 4,194,663 A | 3/1980 | West et al. | | 226/139 |
| 4,244,915 A | 1/1981 | Boardman | | 264/551 |
| 4,255,382 A | 3/1981 | Arends et al. | | 264/544 |
| 4,287,836 A | 9/1981 | Aoki | | 108/57.25 |
| 4,348,442 A | 9/1982 | Figge | | 428/72 |
| 4,377,377 A | 3/1983 | Arends et al. | | 425/155 |
| 4,428,306 A | 1/1984 | Dresen et al. | | 108/53.3 |
| 4,464,329 A | 8/1984 | Whiteside et al. | | 264/544 |
| 4,488,496 A | 12/1984 | Polacco | | 108/51.3 |
| 4,500,213 A | 2/1985 | Grimm | | 368/208 |
| 4,507,348 A | 3/1985 | Nagata et al. | | 428/172 |
| 4,509,432 A | 4/1985 | Win | | 108/57.25 |
| 4,509,909 A | 4/1985 | Arends | | 425/388 |
| 4,513,048 A | 4/1985 | Kaube et al. | | 428/188 |
| 4,531,901 A | 7/1985 | Andersen | | 425/150 |
| 4,555,381 A | 11/1985 | Chazal et al. | | 264/516 |
| 4,600,376 A | 7/1986 | Gillman et al. | | 425/346 |
| 4,606,278 A | 8/1986 | Shuert | | 108/57.27 |
| 4,608,009 A | 8/1986 | Whiteside et al. | | 425/590 |
| 4,636,348 A | 1/1987 | Whiteside | | 264/544 |
| 4,649,007 A | 3/1987 | Bonis et al. | | 264/148 |
| 4,666,544 A | 5/1987 | Whiteside et al. | | 156/212 |
| 4,742,781 A | 5/1988 | Shuert | | 108/53.3 |
| 4,801,347 A | 1/1989 | Garwood | | 156/245 |
| 4,846,077 A | 7/1989 | Win | | 108/57.25 |
| 4,907,515 A | 3/1990 | Win | | 108/57.25 |
| 4,969,812 A | 11/1990 | Brown | | 425/398 |
| 5,007,225 A | 4/1991 | Teasdale | | 52/783.17 |
| 5,030,501 A | 7/1991 | Colvin et al. | | 428/178 |
| 5,042,396 A | 8/1991 | Shuert | | 108/57.25 |
| 5,046,434 A | 9/1991 | Breezer et al. | | 108/57.25 |
| 5,071,603 A | 12/1991 | Kurumaji et al. | | 264/40.5 |
| 5,088,418 A | 2/1992 | Reckermann et al. | | 108/57.25 |
| 5,108,529 A | 4/1992 | Shuert | | 156/214 |
| 5,117,762 A | 6/1992 | Shuert | | 108/57.25 |
| 5,123,359 A | 6/1992 | DelBalso | | 108/57.27 |
| 5,123,541 A | 6/1992 | Giannini et al. | | 206/600 |
| 5,143,778 A | 9/1992 | Shuert | | 428/213 |
| 5,156,782 A | 10/1992 | Ballantyne | | 264/40.5 |
| 5,164,211 A | 11/1992 | Comer | | 426/129 |
| 5,167,969 A | 12/1992 | DeMaio, Jr. et al. | | 425/388 |
| 5,168,817 A | 12/1992 | Nulle et al. | | 108/57.29 |
| 5,197,395 A | 3/1993 | Pigott et al. | | 108/56.1 |
| 5,197,396 A | 3/1993 | Breezer et al. | | 108/56.3 |
| 5,225,213 A | 7/1993 | Brown et al. | | 425/292 |
| 5,226,373 A | 7/1993 | Esch | | 108/57.19 |
| 5,229,648 A | 7/1993 | Sues et al. | | 307/10.2 |
| 5,252,024 A | 10/1993 | Breda et al. | | 414/806 |
| 5,255,613 A | 10/1993 | Shuert | | 108/52.1 |
| 5,283,028 A | 2/1994 | Breezer et al. | | 264/511 |
| 5,283,029 A | 2/1994 | Ellemor | | 264/544 |
| 5,329,861 A | 7/1994 | McCarthy | | 108/51.3 |
| 5,329,862 A | 7/1994 | Breezer et al. | | 108/55.5 |
| 5,337,681 A | 8/1994 | Schrage | | 108/56.1 |
| 5,351,627 A | 10/1994 | Junaedi | | 108/56.1 |
| 5,351,628 A | 10/1994 | Breezer et al. | | 108/56.1 |
| 5,351,629 A | 10/1994 | Breezer et al. | | 108/56.3 |
| 5,367,960 A | 11/1994 | Schleicher | | 108/57.32 |
| 5,367,961 A | 11/1994 | Arai et al. | | 108/56.3 |
| 5,390,467 A | 2/1995 | Shuert | | 52/783.14 |
| 5,391,251 A | 2/1995 | Shuert | | 152/292 |
| 5,401,347 A | 3/1995 | Shuert | | 156/245 |
| 5,402,735 A | 4/1995 | DeJean | | 108/57.17 |
| 5,404,829 A | 4/1995 | Shuert | | 108/57.26 |
| 5,407,632 A | 4/1995 | Constantino et al. | | 264/565 |
| 5,408,937 A | 4/1995 | Knight, IV et al. | | 108/55.5 |
| 5,413,052 A | 5/1995 | Breezer et al. | | 108/56.1 |
| 5,427,732 A | 6/1995 | Shuert | | 264/545 |
| 5,448,110 A | 9/1995 | Tuttle et al. | | 257/723 |
| 5,470,641 A | 11/1995 | Shuert | | 428/178 |
| 5,479,416 A | 12/1995 | Snodgrass et al. | | 714/785 |
| 5,486,405 A | 1/1996 | Laves | | 347/251 |
| 5,492,069 A | 2/1996 | Alexander et al. | | 108/56.3 |
| 5,505,141 A | 4/1996 | Barber | | 108/57.26 |
| 5,517,188 A | 5/1996 | Carroll et al. | | 340/10.52 |
| 5,527,585 A | 6/1996 | Needham et al. | | 428/156 |
| 5,531,585 A | 7/1996 | Lupke | | 425/233 |
| 5,535,668 A | 7/1996 | Besaw et al. | | 108/51.3 |
| 5,539,775 A | 7/1996 | Tuttle et al. | | 375/145 |
| 5,555,820 A | 9/1996 | Shuert | | 108/57.25 |
| 5,565,846 A | 10/1996 | Geizler | | 340/572.2 |
| 5,565,858 A | 10/1996 | Guthrie | | 514/254.06 |
| 5,583,819 A | 12/1996 | Roesner et al. | | 340/10.51 |
| 5,596,933 A | 1/1997 | Knight et al. | | 108/57.27 |
| 5,606,921 A | 3/1997 | Elder et al. | | 108/53.3 |
| 5,620,715 A | 4/1997 | Hart et al. | | 425/143 |
| 5,624,622 A | 4/1997 | Boyce et al. | | 264/258 |
| 5,624,630 A | 4/1997 | Breezer et al. | | 264/553 |
| 5,635,129 A | 6/1997 | Breezer et al. | | 264/553 |
| 5,635,306 A | 6/1997 | Minamida et al. | | 428/593 |
| 5,638,760 A | 6/1997 | Jordan et al. | | 108/57.25 |
| 5,649,295 A | 7/1997 | Shober et al. | | 340/10.1 |
| 5,657,007 A | 8/1997 | Anderson et al. | | 340/904 |
| 5,661,457 A | 8/1997 | Ghaffari et al. | | 340/572.7 |
| 5,662,048 A | 9/1997 | Kralj et al. | | 108/56.3 |
| 5,664,322 A | 9/1997 | Best | | 29/784 |
| 5,676,064 A | 10/1997 | Shuert | | 108/57.25 |
| 5,686,928 A | 11/1997 | Pritchett et al. | | 343/711 |
| 5,687,652 A | 11/1997 | Ruma | | 108/57.25 |
| 5,708,423 A | 1/1998 | Ghaffari et al. | | 340/5.8 |
| 5,716,581 A | 2/1998 | Tirrell et al. | | 264/545 |
| 5,730,252 A | 3/1998 | Herbinet | | 186/52 |
| 5,755,162 A | 5/1998 | Knight et al. | | 108/53.1 |
| 5,769,003 A | 6/1998 | Rose et al. | | 108/55.3 |
| 5,774,876 A | 6/1998 | Woolley et al. | | 705/28 |
| 5,778,801 A | 7/1998 | Delacour | | 108/57.25 |
| 5,782,129 A | 7/1998 | Vanderzee et al. | | 72/405.1 |
| 5,791,262 A | 8/1998 | Knight et al. | | 108/57.25 |
| 5,792,483 A * | 8/1998 | Siegrist et al. | | 425/135 |
| 5,794,542 A | 8/1998 | Besaw | | 108/51.3 |
| 5,794,544 A | 8/1998 | Shuert | | 108/57.25 |
| 5,800,846 A | 9/1998 | Hart | | 425/508 |
| 5,804,810 A | 9/1998 | Woolley et al. | | 235/492 |
| 5,813,355 A | 9/1998 | Brown et al. | | 108/53.3 |
| 5,814,185 A | 9/1998 | Chun et al. | | 156/580 |
| 5,818,348 A | 10/1998 | Walczak et al. | | 340/10.3 |
| 5,822,683 A | 10/1998 | Paschen | | 340/10.34 |
| 5,822,714 A | 10/1998 | Cato | | 702/108 |
| 5,830,299 A | 11/1998 | Teixidor Casanovas et al. | | 156/70 |
| 5,836,255 A | 11/1998 | Uitz | | 108/57.25 |
| 5,843,366 A | 12/1998 | Shuert | | 264/545 |
| 5,845,588 A | 12/1998 | Gronnevik | | 108/57.27 |
| 5,860,369 A | 1/1999 | John et al. | | 108/57.26 |
| 5,862,760 A | 1/1999 | Kohlhaas | | 108/56.3 |
| 5,864,318 A | 1/1999 | Cosenza et al. | | 343/700 MS |
| 5,868,080 A | 2/1999 | Wyler et al. | | 108/57.25 |
| 5,879,495 A | 3/1999 | Evans | | 156/82 |
| 5,885,691 A | 3/1999 | Breezer et al. | | 428/156 |
| 5,894,803 A | 4/1999 | Kuga | | 108/51.11 |
| 5,900,203 A | 5/1999 | Needham et al. | | 264/248 |
| 5,908,135 A | 6/1999 | Bradford et al. | | 220/673 |
| 5,921,189 A | 7/1999 | Estepp | | 108/57.16 |
| 5,929,779 A | 7/1999 | MacLellan et al. | | 340/10.2 |
| 5,933,354 A | 8/1999 | Shimada et al. | | 700/228 |
| 5,936,527 A | 8/1999 | Isaacman et al. | | 340/572.1 |

| Patent No. | Kind | Date | Inventor | Class |
|---|---|---|---|---|
| 5,942,987 | A | 8/1999 | Heinrich et al. | 340/10.42 |
| 5,950,545 | A | 9/1999 | Shuert | 108/53.3 |
| 5,950,546 | A | 9/1999 | Brown et al. | 108/56.1 |
| 5,955,950 | A | 9/1999 | Gallagher, III et al. | 340/572.1 |
| 5,963,144 | A | 10/1999 | Kruest | 340/10.1 |
| 5,967,057 | A | 10/1999 | Nakayama et al. | 108/57.25 |
| 5,971,592 | A | 10/1999 | Kralj et al. | 700/225 |
| 5,973,599 | A | 10/1999 | Nicholson et al. | 340/572.8 |
| 5,975,879 | A | 11/1999 | Dresen et al. | 425/504 |
| 5,980,231 | A | 11/1999 | Arends et al. | 425/397 |
| 5,986,569 | A | 11/1999 | Mish et al. | 340/10.42 |
| 5,986,570 | A | 11/1999 | Black et al. | 340/10.2 |
| 5,993,724 | A | 11/1999 | Shuert | 264/545 |
| 5,999,091 | A | 12/1999 | Wortham | 340/431 |
| 6,006,677 | A | 12/1999 | Apps et al. | 108/57.25 |
| 6,013,949 | A | 1/2000 | Tuttle | 257/723 |
| 6,018,641 | A | 1/2000 | Tsubouchi et al. | 340/10.3 |
| 6,018,927 | A | 2/2000 | Major | 52/793.1 |
| 6,021,721 | A | 2/2000 | Rushton | 108/56.3 |
| 6,025,780 | A | 2/2000 | Bowers et al. | 340/572.3 |
| 6,026,304 | A | 2/2000 | Hilsenrath et al. | 455/456.2 |
| 6,027,027 | A | 2/2000 | Smithgall | 235/488 |
| 6,029,583 | A | 2/2000 | LeTrudet | 108/57.25 |
| 6,107,698 | A | 8/2000 | Ochiai et al. | 307/43 |
| 6,172,608 | B1 | 1/2001 | Cole | 340/572.1 |
| 6,199,488 | B1 | 3/2001 | Favaron et al. | 108/57.25 |
| 6,212,401 | B1 | 4/2001 | Ackley | 455/556.1 |
| 6,246,882 | B1 | 6/2001 | Lachance | 455/456.4 |
| 6,302,461 | B1 | 10/2001 | Debras | 294/68.1 |
| 6,389,989 | B1 | 5/2002 | Hagerty | 108/57.25 |
| 6,456,852 | B2 | 9/2002 | Bar et al. | 455/456.1 |
| 6,483,434 | B1 | 11/2002 | UmiKer | 340/572.1 |
| 6,496,806 | B1 | 12/2002 | Horwitz | 705/28 |
| 6,542,114 | B1 | 4/2003 | Eagleson et al. | 342/357.07 |
| 6,563,417 | B1 | 5/2003 | Shaw | 250/338.5 |
| 6,572,797 | B1 * | 6/2003 | Hibi et al. | 425/135 |
| 6,614,349 | B1 | 9/2003 | Proctor et al. | 340/572.1 |
| 6,667,092 | B1 | 12/2003 | Brollier et al. | 428/182 |
| 6,669,089 | B2 | 12/2003 | Cybulski et al. | 235/385 |
| 6,687,238 | B1 | 2/2004 | Soong et al. | 370/335 |
| 6,702,968 | B2 | 3/2004 | Stevenson et al. | 264/104 |
| 6,710,891 | B1 | 3/2004 | Vraa et al. | 358/1.12 |
| 6,720,866 | B1 | 4/2004 | Sorrells et al. | 340/10.4 |
| 6,720,888 | B2 | 4/2004 | Eagleson et al. | 340/435 |
| 6,726,099 | B2 | 4/2004 | Becker et al. | 235/380 |
| 6,735,630 | B1 | 5/2004 | Gelvin et al. | 709/224 |
| 6,738,628 | B1 | 5/2004 | McCall et al. | 455/456.1 |
| 6,743,319 | B2 | 6/2004 | Kydd | 156/230 |
| 6,745,703 | B2 | 6/2004 | Torrey et al. | 108/51.11 |
| 6,750,771 | B1 | 6/2004 | Brand | 340/572.7 |
| 6,778,088 | B1 | 8/2004 | Forster | 711/145 |
| 6,778,089 | B2 | 8/2004 | Yoakum | 340/572.8 |
| 6,801,833 | B2 | 10/2004 | Pintsov et al. | 700/223 |
| 6,806,808 | B1 | 10/2004 | Watters et al. | 340/10.41 |
| 6,812,824 | B1 | 11/2004 | Goldinger et al. | 340/10.1 |
| 6,814,287 | B1 | 11/2004 | Chang et al. | 235/451 |
| 6,816,076 | B2 | 11/2004 | Pomes | 340/572.1 |
| 6,817,522 | B2 | 11/2004 | Brignone et al. | 235/385 |
| 6,830,181 | B1 | 12/2004 | Bennett | 235/440 |
| 6,832,251 | B1 | 12/2004 | Gelvin et al. | 709/224 |
| 6,839,604 | B2 | 1/2005 | Godfrey et al. | 700/116 |
| 6,844,857 | B2 | 1/2005 | Loftus et al. | 343/725 |
| 6,847,892 | B2 | 1/2005 | Zhou et al. | 701/213 |
| 6,856,856 | B1 * | 2/2005 | Kolavennu et al. | 425/135 |
| 6,865,427 | B2 | 3/2005 | Brown et al. | 700/19 |
| 6,889,165 | B2 | 5/2005 | Lind et al. | 702/183 |
| 6,895,221 | B2 | 5/2005 | Gunnarsson | 455/41.2 |
| 6,895,255 | B1 | 5/2005 | Bridgelall | 455/552.1 |
| 6,900,731 | B2 | 5/2005 | Kreiner et al. | 340/572.1 |
| 6,903,656 | B1 | 6/2005 | Lee | 340/572.1 |
| 6,917,300 | B2 | 7/2005 | Allen | 340/686.6 |
| 6,917,808 | B1 | 7/2005 | Nelson | 455/436 |
| 6,933,849 | B2 | 8/2005 | Sawyer | 340/572.4 |
| 6,940,392 | B2 | 9/2005 | Chan et al. | 340/10.4 |
| 6,941,184 | B2 | 9/2005 | Ebert | 700/115 |
| 6,975,915 | B2 | 12/2005 | Robitaille et al. | 700/108 |
| 6,979,187 | B2 * | 12/2005 | Hinzpeter et al. | 425/135 |
| 6,993,298 | B2 | 1/2006 | Licht | 455/90.3 |
| 7,010,384 | B2 | 3/2006 | Lindstrom et al. | 700/169 |
| 7,033,667 | B2 | 4/2006 | Voss-Kehl et al. | 428/209 |
| 7,035,877 | B2 | 4/2006 | Markham et al. | 707/200 |
| 7,047,159 | B2 | 5/2006 | Muehl et al. | 702/184 |
| 7,058,475 | B2 | 6/2006 | Eehardt | 700/197 |
| 7,062,262 | B2 | 6/2006 | Baird | 455/419 |
| 7,069,100 | B2 | 6/2006 | Monette et al. | 700/116 |
| 7,069,856 | B2 | 7/2006 | Hartka et al. | 101/483 |
| 7,073,712 | B2 | 7/2006 | Jusas et al. | 235/451 |
| 7,090,734 | B2 | 8/2006 | Aster et al. | 156/64 |
| 7,090,740 | B2 | 8/2006 | Dronzek | 156/308.8 |
| 7,092,771 | B2 | 8/2006 | Retich et al. | 700/72 |
| 7,092,781 | B2 | 8/2006 | Franz et al. | 700/122 |
| 7,093,756 | B2 | 8/2006 | Muehl et al. | 235/451 |
| 7,101,500 | B2 | 9/2006 | Anderson et al. | 264/37.17 |
| 7,102,518 | B2 | 9/2006 | Bellum et al. | 340/572.1 |
| 7,126,469 | B2 | 10/2006 | Fish | 340/539.1 |
| 7,130,773 | B1 | 10/2006 | Wong | 702/189 |
| 2002/0017745 | A1 | 2/2002 | Vorenkamp et al. | 264/492 |
| 2002/0020487 | A1 | 2/2002 | Vorenkamp et al. | 156/244.19 |
| 2002/0020705 | A1 | 2/2002 | Vorenkamp et al. | 220/4.14 |
| 2002/0021208 | A1 | 2/2002 | Nicholson et al. | 340/10.34 |
| 2002/0111819 | A1 | 8/2002 | Li et al. | 705/1 |
| 2002/0115436 | A1 | 8/2002 | Howell et al. | 455/426.1 |
| 2002/0126013 | A1 | 9/2002 | Bridgelall | 340/572.1 |
| 2002/0130817 | A1 | 9/2002 | Forster et al. | 343/770 |
| 2002/0170961 | A1 | 11/2002 | Dickson et al. | 235/383 |
| 2002/0196771 | A1 | 12/2002 | Vij et al. | 370/349 |
| 2003/0083920 | A1 | 5/2003 | Richards et al. | 705/8 |
| 2004/0046643 | A1 | 3/2004 | Becker et al. | 340/10.41 |
| 2004/0061324 | A1 | 4/2004 | Howard | 283/69 |
| 2004/0069851 | A1 | 4/2004 | Grunes et al. | 235/435 |
| 2004/0069852 | A1 | 4/2004 | Seppinen et al. | 235/451 |
| 2004/0070504 | A1 | 4/2004 | Brollier et al. | 340/572.8 |
| 2004/0078151 | A1 | 4/2004 | Aljadeff et al. | 702/40 |
| 2004/0078289 | A1 | 4/2004 | Barid | 705/26 |
| 2004/0085191 | A1 | 5/2004 | Horwitz et al. | 340/10.3 |
| 2004/0088065 | A1 | 5/2004 | Robitaille et al. | 700/95 |
| 2004/0105411 | A1 | 6/2004 | Boatwright et al. | 370/338 |
| 2004/0106376 | A1 | 6/2004 | Forster | 455/41.2 |
| 2004/0108378 | A1 | 6/2004 | Gatz | 235/385 |
| 2004/0111335 | A1 | 6/2004 | Black et al. | 705/28 |
| 2004/0150525 | A1 | 8/2004 | Wilson et al. | 340/572.1 |
| 2004/0162628 | A1 | 8/2004 | Mori | 700/116 |
| 2004/0171373 | A1 | 9/2004 | Suda et al. | 455/415 |
| 2004/0174260 | A1 | 9/2004 | Wagner | 340/568.1 |
| 2004/0177012 | A1 | 9/2004 | Flanagan | 705/28 |
| 2004/0177032 | A1 | 9/2004 | Bradley et al. | 705/38 |
| 2004/0185667 | A1 | 9/2004 | Jenson | 438/689 |
| 2004/0203352 | A1 | 10/2004 | Hall et al. | 455/41.1 |
| 2004/0212480 | A1 | 10/2004 | Carrender et al. | 340/10.34 |
| 2004/0217865 | A1 | 11/2004 | Turner | 340/572.7 |
| 2004/0226392 | A1 | 11/2004 | McNally | 73/866.1 |
| 2004/0233789 | A1 | 11/2004 | Oguchi et al. | 368/47 |
| 2004/0239498 | A1 | 12/2004 | Miller | 340/539.13 |
| 2004/0252025 | A1 | 12/2004 | Silverbrook et al. | 340/568.5 |
| 2005/0003036 | A1 * | 1/2005 | Nishimura et al. | 425/135 |
| 2005/0024200 | A1 | 2/2005 | Lambright et al. | 340/539.1 |
| 2005/0030160 | A1 | 2/2005 | Goren et al. | 340/10.5 |
| 2005/0040934 | A1 | 2/2005 | Shanton | 340/5.92 |
| 2005/0043850 | A1 | 2/2005 | Stevens et al. | 700/213 |
| 2005/0054290 | A1 | 3/2005 | Logan et al. | 455/41.2 |
| 2005/0060246 | A1 | 3/2005 | Lastinger et al. | 705/28 |
| 2005/0071234 | A1 | 3/2005 | Schon | 705/22 |
| 2005/0076816 | A1 * | 4/2005 | Nakano | 108/51.11 |
| 2005/0083177 | A1 | 4/2005 | Willgert | 340/10.1 |
| 2005/0083180 | A1 | 4/2005 | Horwitz et al. | 340/10.4 |

| | | | | | | |
|---|---|---|---|---|---|---|
| 2005/0095359 A1 | 5/2005 | Pallante et al. ............ 427/207.1 | 2006/0047377 A1 | 3/2006 | Ferguson et al. ................ 701/2 |
| 2005/0097010 A1 | 5/2005 | Carrender .................... 705/28 | 2006/0047458 A1 | 3/2006 | Benjamin et al. ............ 702/117 |
| 2005/0098620 A1 | 5/2005 | Dunlap, Jr. ................. 235/375 | 2006/0061452 A1 | 3/2006 | Nagayama et al. ......... 340/10.5 |
| 2005/0099292 A1 | 5/2005 | Sajkowsky ............. 340/539.13 | 2006/0082446 A1 | 4/2006 | Dods ....................... 340/10.51 |
| 2005/0102320 A1 | 5/2005 | Breimesser et al. ...... 707/104.1 | 2006/0085087 A1 | 4/2006 | Hass et al. .................... 700/95 |
| 2005/0103835 A1 | 5/2005 | Kunito et al. ............... 235/375 | 2006/0091196 A1 | 5/2006 | Durham et al. ............. 235/375 |
| 2005/0104747 A1 | 5/2005 | Silic et al. ................... 340/944 | 2006/0091199 A1 | 5/2006 | Loughran ................... 235/376 |
| 2005/0107092 A1 | 5/2005 | Charych et al. .......... 455/456.1 | 2006/0097873 A1 | 5/2006 | Vrba et al. ................ 340/572.1 |
| 2005/0128083 A1 | 6/2005 | Puzio et al. ............. 340/572.1 | 2006/0108411 A1 | 5/2006 | Macurek et al. ............. 235/375 |
| 2005/0140511 A1 | 6/2005 | Bonnell et al. ........... 340/572.7 | 2006/0131379 A1 | 6/2006 | Aoki et al. .................. 235/376 |
| 2005/0143133 A1 | 6/2005 | Bridgelall et al. ........ 455/562.1 | 2006/0145710 A1 | 7/2006 | Puleston et al. ............ 324/750 |
| 2005/0168325 A1 | 8/2005 | Lievre et al. ............... 340/10.6 | 2006/0149404 A1 | 7/2006 | Denton et al. ................. 700/99 |
| 2005/0193222 A1 | 9/2005 | Greene .......................... 765/5 | 2006/0149407 A1 | 7/2006 | Markham et al. ........... 700/108 |
| 2005/0194446 A1 | 9/2005 | Wiklof et al. .......... 235/462.46 | 2006/0167571 A1 | 7/2006 | Wu et al. ...................... 700/83 |
| 2005/0195775 A1 | 9/2005 | Petite et al. ................. 370/338 | 2006/0169385 A1 | 8/2006 | Sharma et al. ................. 156/64 |
| 2005/0197074 A1 | 9/2005 | Cullen et al. ............... 455/90.3 | 2006/0170551 A1 | 8/2006 | Nakamura et al. ........ 340/572.1 |
| 2005/0198208 A1 | 9/2005 | Nystrom ..................... 709/219 | 2006/0176180 A1 | 8/2006 | Freund ..................... 340/572.8 |
| 2005/0198228 A1 | 9/2005 | Bajwa et al. ................ 709/220 | 2006/0178760 A1 | 8/2006 | Mann et al. ................... 700/27 |
| 2005/0205676 A1 | 9/2005 | Saito ........................... 235/439 | 2006/0202830 A1 | 9/2006 | Scharfeld et al. ......... 340/572.7 |
| 2005/0206520 A1 | 9/2005 | Decker et al. .......... 340/539.22 | 2006/0212166 A1 | 9/2006 | Cowling et al. ............. 700/225 |
| 2005/0232747 A1 | 10/2005 | Brackmann et al. ......... 414/803 | 2006/0212425 A1 | 9/2006 | Stam et al. ..................... 707/3 |
| 2005/0237195 A1 | 10/2005 | Urban ..................... 340/572.1 | 2006/0215978 A1 | 9/2006 | Choy et al. .................. 385/134 |
| 2006/0006885 A1 | 1/2006 | Helmut Bode et al. ...... 324/750 | 2006/0222430 A1 | 10/2006 | Duckett et al. .............. 400/583 |
| 2006/0010685 A1 | 1/2006 | Kobayashi et al. ............ 29/825 | 2006/0230966 A1 | 10/2006 | Brod et al. ................... 101/484 |
| 2006/0011288 A1 | 1/2006 | Watanabe et al. ...... 156/244.11 | 2008/0038393 A1* | 2/2008 | Saito et al. .................. 425/135 |
| 2006/0025957 A1 | 2/2006 | Lind et al. .................. 702/127 | | | |
| 2006/0041845 A1 | 2/2006 | Ferguson et al. ............. 715/751 | * cited by examiner | | |

THERMOFORMED PLATFORM HAVING A COMMUNICATIONS DEVICE

CROSS-REFERENCE TO RELATED APPLICATIONS

This application is a continuation of U.S. patent application Ser. No. 11/102,221 filed on Apr. 8, 2005, which claims the benefit of U.S. patent application Ser. No. 09/770,097 filed on Jan. 24, 2001, now U.S. Pat. No. 6,943,678 issued Sep. 13, 2005, and U.S. Provisional application No. 60/177,383, filed on Jan. 24, 2000. The disclosures of the above applications are incorporated herein by reference.

BACKGROUND OF THE INVENTION

1. Field of Invention

This invention generally relates to thermoformed apparatus and, more particularly, to a polymeric pallet or container having a communications device.

2. Description of the Prior Art

The 48 inch by 40 inch wood pallet is an integral part of North America's distribution system, and is involved in one way or another in the movement of a significant proportion of all goods bought and sold. According to Material Handling Engineering, (October 1999), page 16, the U.S. Forest Service estimates there are 1.9 billion wooden pallets in America. Approximately 400 million new pallets are needed each year. 175 million of these are pallets repaired for reuse by industry. Therefore, roughly 225 million new wooden pallets enter the supply chain each year. The standard 48 inch by 40 inch wood pallet makes up a significant proportion of the total number of wood pallets within the over-all distribution system.

U.S. Forest Service researchers also found that 225 million wooden pallets are sent to landfills each year. According to CHEP Equipment Pooling Systems, the largest third party pallet leasing company with 94 million wooden pallets, the average 48 inch by 40 inch wooden pallet weighs between 28 pounds and 65 pound at time of manufacture (dry). These traditional wooden pallets range from 48 pounds to 110 pounds in weight (wet) at time of recycling or disposal. Using these figures, approximately 17.8 billion pounds of wood is deposited in landfills each year. APA, the Engineered Wood Association, estimates that a standard 48 inch by 40 inch style lumber stringer pallet has a three year life. The three year cost for this style of wooden pallet is estimated to be $11.74. A three year life is based on 15-24 trips per year. Conventional wooden pallets have limited residual value at the end of their useful life cycle.

According to the Grocery Manufacturers of America (hereinafter "GMA"), the largest end-user of traditional 48 inch by 40 inch wooden pallets within the North American distribution system, the current wooden pallet exchange system costs the industry nearly $2 billion to operate in 1991. For example, the trucking industry is unable to optimize semi trailer loading or per-unit transportation costs because GMA style pallets are not capable of true four-way entry. Drivers are required to exchange loaded pallets for empty pallets after delivery, and because of manual pallet handling injuries, workers compensation claims are significant. Grocery distributors are unable to use automated material handling equipment efficiently because unacceptable wooden pallets must be removed from the pallet supply chain. Grocery manufacturers and shippers experience product damage because of design flaws in traditional wooden pallets. Furthermore, unit loading is not evenly distributed with stringer pallet designs, which results in product and packaging damaged in transport. Manufacturers must use stronger and costlier packaging because of wooden pallet problems. Wooden pallet sanitation and moisture absorption difficulties affect meat and other food processors. Moreover, general pallet deterioration, manifested by protruding nails and staples, splintered wood and missing stringers, results in significant inefficiencies within the over-all distribution system.

More and more companies are finding it preferable to employ third-party pallet management services to control the costs and logistics of using wooden pallets. For example, some fruit growers require pallets on a seasonal basis. Wooden pallets may therefore be rented for short or long terms from third parties. Third party service companies offer nationwide access to pools of wooden pallets, have responsibility for collecting and redeploying pallets where they are needed, and keep the pallet pool at a relatively high level of quality to move product through the distribution channel. The pallet tracking and retrieval systems deployed by the third party providers are more elaborate and efficient than other segments within the wooden pallet market. For example, bar code labels have been used to manage the efficiency of conventional pallet assets. A direct line of sight is, however, required by the scanner to read a bar card label. The performance of these systems has been generally unreliable and costly to implement within a wooden pallet environment.

Conventional Radio Frequency Identification (hereinafter "RFID") systems have also been used but without success for a number of reasons. For instance, there are too many makes and models of 48 inch by 40 inch wooden pallet in the market. Also, a standard protocol has not been advanced. Furthermore, pallet handling procedures, material deterioration, product damage and repair practices require a more robust RFID tag technology than is currently available and wood is not a stable platform for the attachment of many types of RFID tags. Additionally, radio frequencies are absorbed by moisture in wood, which makes tag reads unreliable. Standard harsh operating conditions within the wooden pallet distribution system, such as thermal shock, sanitation, flexure, vibration, compressive forces, and fork impacts, can cause tag transponder coils to break and fail.

The velocity at which 48 inch by 40 inch wooden pallets travel through the distribution system is far less than optimum because a significant proportion of wooden pallets are not suitable for transporting goods, damage free. Although 175 million pallets are repaired each year, industry observers claim as many as 70% of all wooden pallets have deteriorated from their original specifications. Unacceptable wooden pallets have to be separated from acceptable wooden pallets, which is time consuming, injurious and wasteful. Accordingly, a far larger pool of wooden pallets is maintained in operation than would otherwise be required under optimum conditions. The traditional 48 inch by 40 inch wooden pallet is therefore tremendously inefficient, costing industry billions of dollars annually. Wooden pallets also have considerable negative societal and environmental impacts because the recourses used to purchase, repair and dispose wooden pallets could be more effectively deployed in other less costly product technology alternatives.

Accordingly, plastic pallets have been used to replace wood pallets with some degree of success over the past several years. Plastic pallets are known for their longevity and are generally more durable, lighter weight, compatible with automated material handling equipment, easily sanitized and 100 percent recyclable. Conventional plastic pallets, however, suffer from one significant disadvantage in that they cost considerably more than a comparable wooden pallet. Thermoplastic materials constitute a significant proportion of the total cost of a plastic pallet, and a given amount of relatively expensive plastic material is required to produce a pallet with a measure of load-bearing strength that is comparable to wooden pallets.

As another example, U.S. Pat. No. 5,986,569 which issued to Mish et al. proposes applying a pressure sensitive tape to the backside of a tag carrier and affixing the carrier to an object. Generally speaking, however, exterior attachment methodologies are not sufficiently robust and durable. Tags affixed to the exterior of the pallet can be damaged through wear and tear, sanitation, forklift impacts, and the like. Also, U.S. Pat. No. 5,936,527 which issued to Isaacman, et al., proposes a "cell" comprising a host transceiver and several local hard lined interrogators that detect local tags. In the Isaacman arrangement, several cells can be networked, which allows any tagged object to be identified from any PC within a multi-cell network.

It is significant that plastic pallet suppliers has been unable to physically identify, locate and track, in real time, comparatively expensive plastic pallets within networks of distribution. It is one thing to lose a low cost wooden pallet, but it is another to loose an expensive asset. Different technologies have been proposed to attempt tracking of pallet assets within the distribution system, but these proposals have been incomplete with respect to system architectures, protocols and plastic pallet design intent. Barcodes have been used, but these require a direct line of sight and have therefore been difficult to implement. RFID tags have been placed upon traditional molded pallets to locate and track their positions within the distribution system, but this type of pallet is so much more expensive than a comparable wooden pallet that the cost justification for implementation is not economical.

Moreover, it is known that conditions within the operating environment affect the performance of the RFID system. Several U.S. patents disclose protocols, circuitry architectures and other enabling methods for ensuring the interrogator properly communicates with one or more tags within an interrogation zone; these include: U.S. Pat. No. 5,229,648 which issued to Shindley et al.; U.S. Pat. No. 5,479,416 which issued to Snodgrass et al.; U.S. Pat. No. 5,539,775 which issued to Tuttle et al.; U.S. Pat. No. 5,583,819 which issued to Roesner et al.; U.S. Pat. No. 5,818,348 which issued to Walezak et al.; U.S. Pat. No. 5,822,714 which issued to Cato; U.S. Pat. No. 5,929,779 which issued to MacLellen et al.; U.S. Pat. No. 5,942,987 which issued to Heinrich et al.; U.S. Pat. No. 5,955,950 which issued to Gallagher et al.; U.S. Pat. No. 5,963,144 which issued to Kruest and U.S. Pat. No. 5,986,570 which issued to Black et al. Still other proposals are offered to overcome the antenna-to-antenna communication difficulties conventionally experienced by tag carriers, such as pallets, as they travel through interrogation fields or portals. The rapidly changing angular geometry of a tag passing through a field or portal results in a diminishing duration and strength of signal transmission, which can produce unreliable tag reading results. The following U.S. Patents Nos. propose solutions to this particular problem: U.S. Pat. No. 5,661,457 which issued to Ghaffari et al.; U.S. Pat. No. 5,708, 423 which issued to Ghaffari et al.; U.S. Pat. No. 5,686,928 which issued to Pritchett et al.; U.S. Pat. No. 5,995,898 which issued to Tuttle; and U.S. Pat. No. 5,999,091 which issued to Wortham.

SUMMARY OF THE INVENTION

In accordance with the present invention there is provided an apparatus for manufacturing extruded plastic sheet having RF devices that includes a local computer linked to a network. A sheet extruder has a first PLC linked to the local computer. An RF device applicator is spaced apart from the extruder and has a second PLC linked to the local computer. The local computer communicates with the network and the second PLC causes the applicator to selectively fix the RF device upon the extruded plastic sheet.

Further in accordance with the present invention there is provided an apparatus for a fixing RF devices to extruded sheet used in the manufacture of thermoformed articles that includes an extruder for providing the sheet. A gantry is spaced apart from the extruder and includes an inventory of RF devices. A press moves the RF devices in a fixed position upon the sheet. A PLC is linked to a computer in the network for controlling the operation of the press.

Additionally the present invention is directed to an apparatus for fixing RF devices to extruded sheet that includes an extruder to produce the sheet with the RF devices positioned thereon. A frame is provided comprising a roll of film and a roller. The roller compresses the film onto the sheet with the RF devices affixed therebetween.

Further the present invention is directed to a method for communicating information associated with extruded sheet from a network to a machine that subsequently modifies the sheet and includes the steps of providing a first apparatus to extrude the sheet. A second apparatus is spaced apart from the first apparatus to affix a RF device to the sheet. A third apparatus is spaced from the second apparatus to at least receive information from the RF device on the sheet and the received information being used by a machine PLC to configure a processing characteristic of the machine for subsequently modifying the sheet.

Further the present invention is directed to a thermoforming apparatus that includes a computer linked to a network. A first read/write module is linked to the computer with a first read/write module reading data stored in a RF device affixed to an extruded sheet. A first PLC is connected to the computer to receive the RF device data from the first module and to configure an operational characteristic of the apparatus based upon the received data. A controllable oven heats the sheet. A controllable platen with a controllable mold is attached thereto to controllably form the heated sheet into an article. A second read/write module is linked to the computer for writing data to the RF device affixed to the article. The written data is subsequently used to identify the article within the network.

Further in accordance with the present invention there is provided a system that includes a manufacturing machine, a receiver, and an electrical control system connected to the machine and the receiver. An extruded sheet with at least one data storage device is affixed thereto with the sheet being manufactured by the machine into an article. The receiver operably interfaces with the data storage device to ascertain data previously stored on the device and the control system changing manufacturing characteristics of the machine based upon data received from the device.

Further the present invention is directed to a system that includes a manufacturing machine. An extruded sheet with at least one data storage device fixed thereto with the sheet is manufactured by the machine into an article. A transceiver is linked to a network and operable to send new data to the affixed data device after being manufactured by the machine.

DESCRIPTION OF THE PREFERRED EMBODIMENTS

Figure 1:
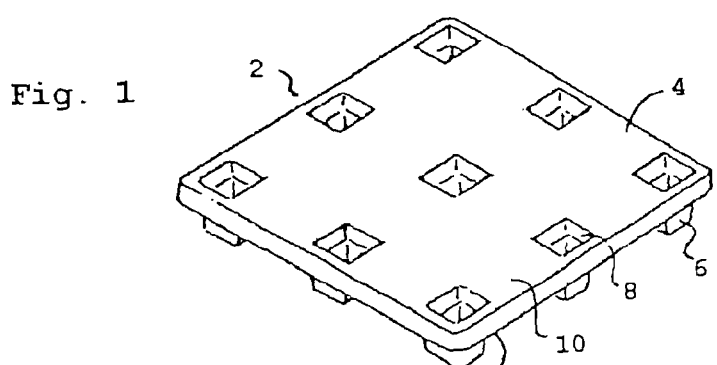
FIG. 1 is a perspective view showing a preferred embodiment of a thermoformed pallet having a radio frequency device of the present invention.
Figure 2:
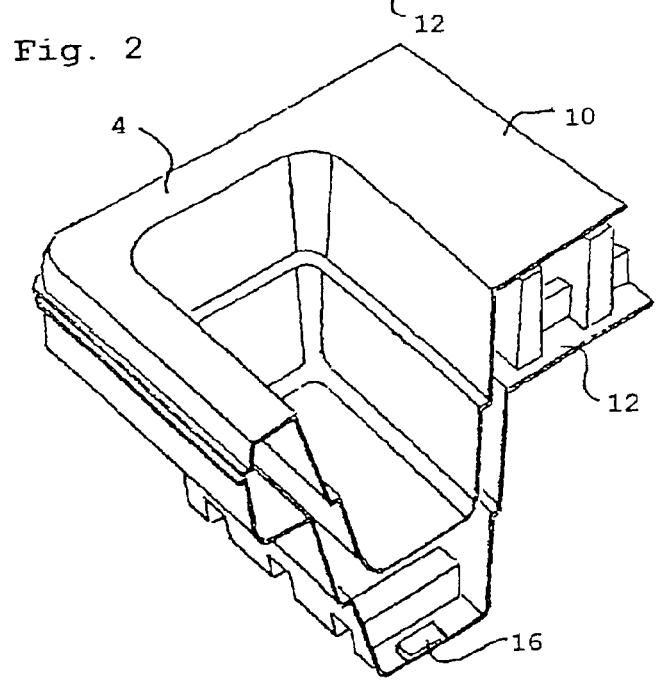
FIG. 2 is a fragmentary perspective view showing a twin sheet variation of the present invention pallet.
Figure 3:
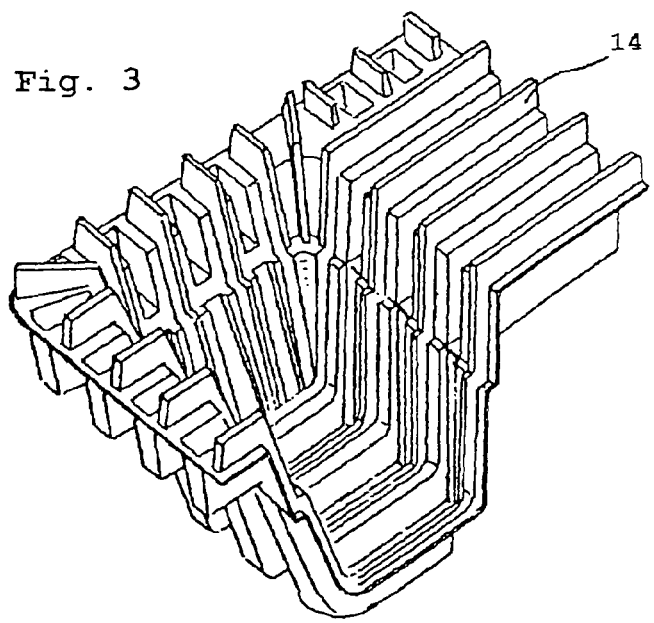
FIG. 3 is a perspective and fragmentary view showing a second variation of the present invention pallet.

Referring to FIGS. 1-3, the preferred embodiments of a pallet apparatus 2 of the present invention employs a nesting pallet 4 and a communications device, such as a radio frequency identification device 16. Nesting pallet 4 has downwardly extending pallet legs 6 which are receivable in pallet pockets 8 of an adjacent pallet to provide a nesting configuration for consolidated storage and transportation. Pallet 4 is made of a plurality of polymeric plastic sheets thermoformed into a single article. Pallet 4 includes a top plastic sheet 10 and a bottom plastic sheet 12. This arrangement is referred to as a twin sheet construction. In one preferred embodiment, plastic sheet 14, shown in FIG. 3, is sandwiched between sheets 10 and 12, in what is referred to as a triple sheet construction. One advantage of a triple sheet construction is that the same load bearing strength of a twin sheet construction can be provided with a much lower measure of relatively expensive plastic in a triple sheet construction. Therefore, depending upon the criteria of the end-user, triple sheet constructions can be used to provide either a lower cost or a stronger pallet 4. The present invention pallet 4 can be made in accordance with U.S. patent application Ser. No. 09/377,792, entitled "Triple Sheet Thermoforming Apparatus, Methods and Articles" which was filed on Aug. 20, 1999 by S. Muirhead; this is incorporated by reference herein. In summary, this method of triple sheet thermoforming provides the same measure of load bearing strength with 25 percent to 50 percent less plastic material than current state of the art twin sheet thermoformed pallets. However, twin sheet thermoformed pallets characterized by U.S. Pat. No. 4,428,306 to Dresen et al., U.S. Pat. No. 5,638,760 to Jordan et al., or U.S. Pat. No. 5,676,064 to Shuert, can be used to practice certain aspects of the invention; these patents are incorporated by reference herein. A triple sheet thermoformed pallet is preferred because it provides a higher measure of strength for the given measure of plastic used by a twin sheet pallet, and is therefore more economically fulfilling the need for a low cost alternative to wooden pallets.

The RFID system is minimally composed of three components including an interrogator (reader or exciter), tag devises 16, and a host computer. The tag is alerted by a radio frequency wave transmitted by the interrogator to return a data message by arrangement. The information stored in memory is thus transmitted back to the interrogator. Information received by an interrogator is used by a host computer to provide a reliable and a secure architecture that meets predetermined performance requirements. In passive RFID systems, the RF field generates voltage that is rectified to power the tag. In active RFID systems, a battery is the source of a tag's power supply. Both passive and active RFID devises may be embedded within the structure of the preferred plastic pallet.

Radio frequency identification tags and interrogators can be made in accordance with the following U.S. Pat. No. 6,027,027 entitled "Luggage Tag Assembly" which issued to Smithgall on Feb. 22, 2000 and U.S. Pat. No. 6,013,949 entitled "Miniature Radio Frequency Transceiver" which issued to Tuttle on Jan. 11, 2000. Both of these patents are incorporated by reference herein.

RFID device 16 is encapsulated between the sheets forming pallet 4. In general, thermoplastic resins are extruded through a machine that produces a selective sheet or web of heat deformable plastic. As the preformed sheet or web travels through the extruder, one or more surfaces of the sheet receives one or more RFID tags. This may be done automatically or manually such that the tag is located on the plastic according to predetermined criteria corresponding to a select molding position upon the thermoforming tooling. Sheet thus tagged moves through a thermoforming machine that molds said sheet into a finished pallet. The tag or tags are sandwiched between the sheets of plastic forming the pallet at predetermined locations. In this manner, the tag is embedded, isolated, protected and contained in a fluid tight plastic barrier that is resilient and long lasting and not externally, physically visible. In order to ensure the RFID device is not damaged in the thermoforming process of preference, a high temperature RFID devise methodology, such as that described in U.S. Pat. No. 5,973,599 which issued to Nicholson et al., may be used; this patent is also incorporated by reference herein. The location of the device within the pallet is selected for system requirements. A plurality of locations can be used by cross-referencing machine and extrusion direction dimension references upon the plastic sheet with their counter part locations upon the properly thermoformed article. Thus, through such registration techniques, a consistent location for positioning the tag upon the sheet relative to its selected location in the finished part can be repeated with a high degree of certainty. In more detail, molded-in structures of the plastic pallet may be adapted to further protect the RFID device from flexural and compressive forces that may other wise damage the device.

The RFID devise 16 is part of a system in which data about the pallet 2 is stored for retrieval according to system criteria. The advantage of encapsulating RFID devise 16 within the structure a pallet 4 is so that the devise 16 is protected from the harsh environment that pallet 4 must operate within.

Figure 4:
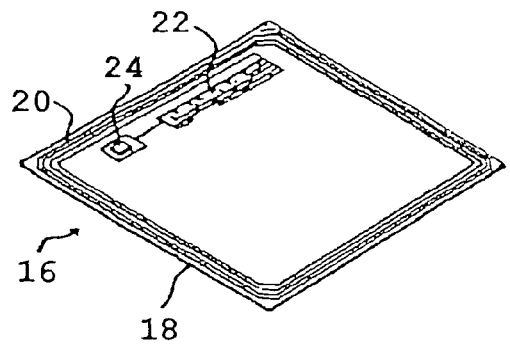
FIG. 4 is a perspective view showing the radio frequency device employed in the present invention pallet.

There are a number of methods that can be used to insert a RFID devise 16 within thermoformed pallet 4. In one embodiment, RFID devise 16 is a passive RFID tag 18. An example of such a passive tag 18 is shown in FIG. 4. Tag 18 comprises an antenna coil 20, modulation circuitry 22 and micro-memory chip or integrated circuit 24. Tag 18 is ultra thin, and in the order of 1 and ½ square inches. A plurality of tags 18 are normally placed upon a polymer tape substrate by the tag manufacturer and delivered on reels for integration into a manufacturing process.

Figure 5:
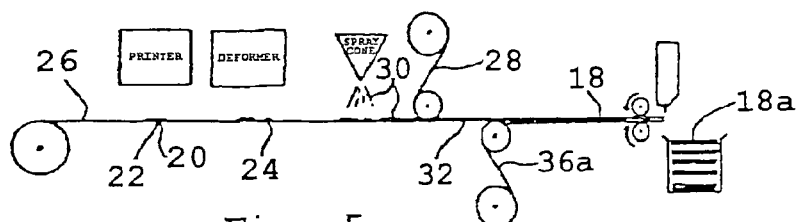
FIGS. 5-7 are diagrammatic views showing the manufacturing process employed with the present invention pallet.
Figure 6:
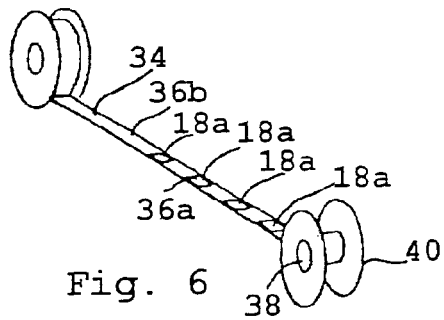

A plastic sheet is heated to a deformable temperature before it is molded by differential vacuum pressure over a mold. Intervention is required to integrate the tag 18 into the present thermoforming process in order to minimize stretching and heat deformation of the PET substrate. As shown in FIGS. 4-6, the first means of intervention includes depositing the coil 20 and circuitry 22 (composed of printable conductive ink) and the memory chip 24 upon a flexible film substrate 26. Substrate 26 is composed of a plastic material that has a high heat deflection capability of >600° F., such as Rodgers Engineering's electrical grade HT 12-1024 resin. After the tag 18 components are deposited onto the substrate 26, a film substrate 28 of substantially the same construction is laminated over substrate 26 with a suitable high temperature resistant adhesive 30 there between to provide a double layered substrate assembly 32. A first pressure sensitive, double sided film 36a is then applied to substrate assembly 32 on the substrate side. Substrate assembly 32 is subsequently sliced or severed such that individual tags 18a are produced. The tags 18 are separately and possibly sequentially deposited onto a paper or plastic carrier 34 with a single sided, pressure sensitive adhesive film 36b. Plastic carrier 34 is wound around a hub 38 to produce a reel 40 that comprises a plurality of tags 18 that adhered to the surface of a plastic sheet by way of first adhesive film 36a.

This arrangement produces a tag construction that is resistant to deformation under the short-term and high heat environment of the thermoforming process. Substrate 32 of tag 18 will not significantly stretch as the attached sheet 62 is deformed over a three dimensional molding surface. Moments of shear at the location of the tag 18 will also be deflected through movement of the adhesive film 36a. Adhesive 30 will deflect compression upon the memory chip by providing a compression buffer (thickness) equal to the elevation of the memory chip 24. In this manner, the tag 18 is developed to sustain the rigors of thermoforming.

Another alternate variation of the communications device in the structure of the pallet provides a power supply, an antenna, a radio frequency transmitter, a radio frequency receiver, a digital signal processor, a pallet information memory chip set, a pallet identification reader card, and circuitry. The memory chip set controls the function of the communicator and the identification reader card identifies the communicator and pallet. The communications device will thereby remotely communicate with an external interrogator in a wireless manner, such as by cellular telephone types of transmissions. This is used to instruct the interrogator to then query tags on or in the pallet or container. The interrogator also includes a power supply, an antenna, a radio frequency transmitter, a radio frequency receiver, a data processing micro-controller and circuitry.

Figure 7:
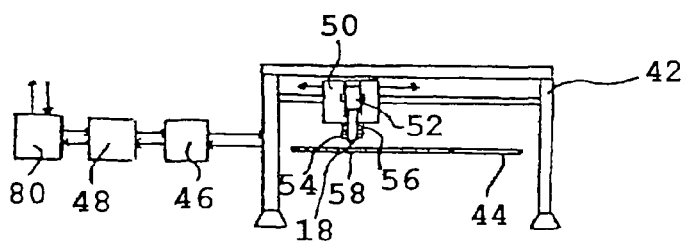

Referring to FIG. 7, an X-Y gantry 42 is positioned along the path traveled by the web 44 of plastic material produced by the sheet extrusion machine (not shown). Gantry 42 cooperates with a programmable logic controller (hereinafter "PLC") 46 that is connected to a local area networked personal computer (hereinafter "LAN PC") 48. Gantry 42 comprises linear high-speed indexer 50 that travels horizontally back and forth according to instructions from PLC 46. Indexer 50 further comprises a reel 40 (see FIG. 6)-to-reel 52 winder apparatus 54 with a vertical press 56. As the web 44 travels through the gantry 42, indexer 50 travels to a predefined location 58, the winder apparatus 54 meters the reel 40 forward, carrying tag 18 into vertical alignment with press 56. Press 56 is instructed to travel vertically to stamp tag 18 onto the web 44. Plastic web 44 travels the length of the extruder and is finally sheared into a standardized sheet dimension at the end of the line thereby defining sheet 62. Subsequently, the sheet and tag 18 are transported to a thermoforming machine for processing.

Figure 8:
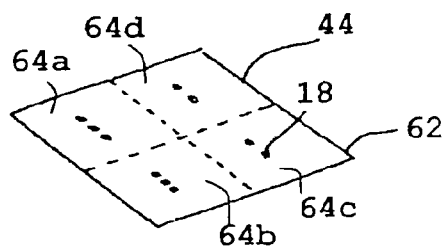
FIG. 8 is diagrammatic perspective view showing the orientation of one radio frequency device arrangement incorporated into the present invention pallet.

Referring to FIG. 8, plastic web 44 is adapted in the machine and extrusion directions to produce a plastic sheet that is dimensioned to be thermoformed against four separate molding application surfaces 64a, 64b, 64c and 64d, illustrated separately by dashed line areas. In this manner, four pallets 4 are produced simultaneously in the thermoforming operation. Multiple tags 18 are located on sheet 62. On each of surfaces 64a and 64b, there are three tags 18. There are also two tags 18 on surfaces 64c and 64d. Thus, batches of pallets 4 can be custom made for different end-uses. The PC 48 interfaces with PLC 46 to instruct indexer 50 to deposit tags 18 in a selective manner. In other embodiments of the present invention, there may be multiple gantries 42 or multiple indexers 50 on one gantry 42 for depositing a variety of RFID tags 18a, 18b, 18c, 18d and 18e upon sheet 62. Alternatively, host computer 80 may interface with LAN PC instructing further systems (not shown) to apply a sequential array of tags 18a, 18b, 18c, 18d or 18e upon the carrier 34 (see FIG. 6) producing reel 40, in the corresponding order to their deposition upon the sheet 62.

Figure 9:
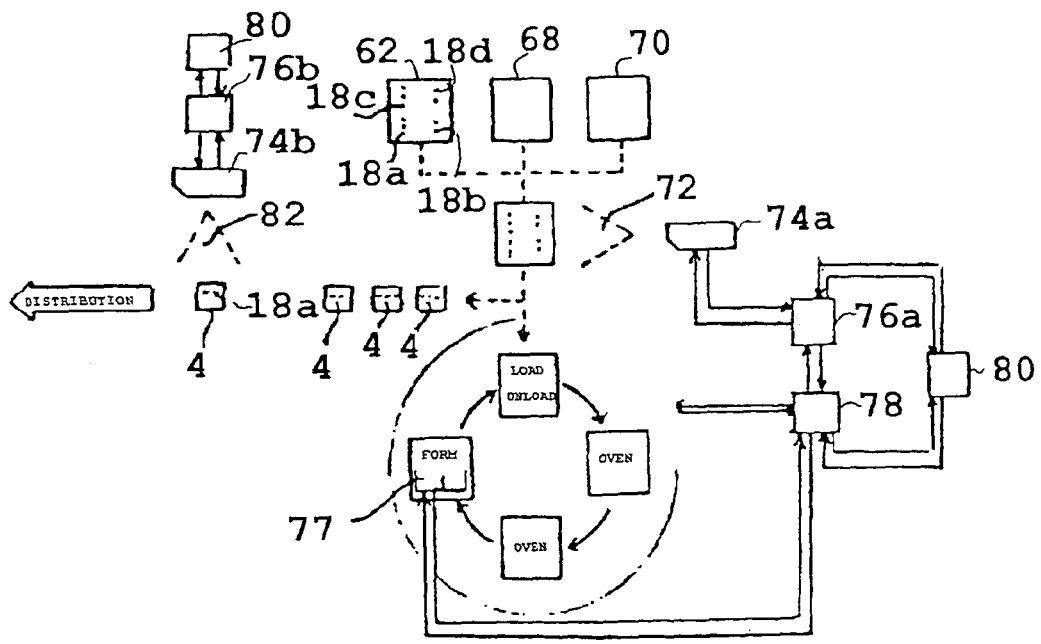
FIG. 9 is a diagrammatic view showing the manufacturing process employed with the present invention pallet.

In the preferred order of arrangement shown in FIG. 9, sheet 62 is thermoformed against a female mold located upon the lower platen of the thermoforming machine. In this manner, when sheet 62 is thermoformed, tags 18 will be encapsulated when molded sheet 68 is selectively fused to sheet 62 in the thermoforming process. This creates a protective barrier around the each tag 18. It should be appreciated, however, that other sheet forming sequences may be utilized in a variety of thermoforming techniques to accomplish the present method.

One of the tags 18, in this example tag 18a, interfaces with a Manufacturing Management System (hereinafter "MMS") deployed throughout the overall manufacturing infrastructure. Sheets 62, 68 and 70 (in the triple sheet method) are conveyed to a thermoforming machine RF interrogator field 72, where a RFID tag interrogator 74 identifies and reads data stored on tags 18a. Tags 18a send preprogrammed data packages back to interrogator 74a. Interrogator 74a interfaces with LAN PC 76 connected to thermoforming machine PLC 78 interfacing through LAN to MMS host computer 80. PLC 78 instructs machine and ancillary equipment how to process the plastic sheets 62, 68 and/or 70. PLC 76 next instructs tooling 77 how to process the plastic sheets 62, 68 and/or 70. If MMS criteria are not met, the thermoforming process is disabled. If MMS criteria are met, tag 18a traverses an interrogator field 82 and tag 18a writes and locks final data into non-volatile tag 18a memory before the pallet 4 exits said field to enter the supply chain. Other tags 18b, 18c, 18d and 18e do not interface with interrogator fields 72 and 82.

Figure 10:
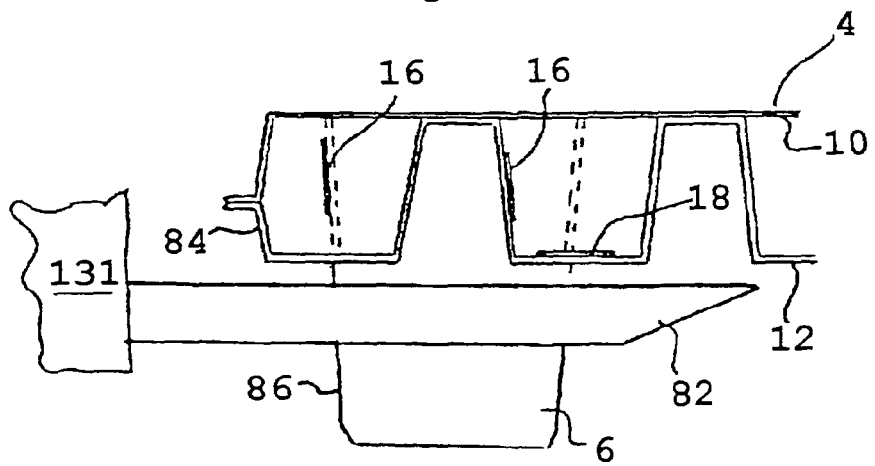
FIGS. 10-12 are cross sectional views showing various radio frequency device locations within the present invention pallet.
Figure 11:
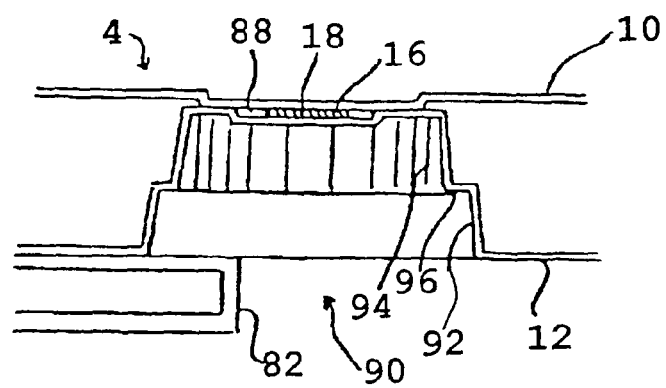

Referring now to FIG. 10, pallet 4 is adapted to enhance the ability of devices 16 to survive long term pallet handling wear and tear. In particular, the tines 82 of a forklift vehicle 131 are used to move pallets 4 throughout the distribution network. When tines 82 are introduced between pallet legs 6 in order to support the weight of the pallet 4 for transportation, several potentially damaging events may occur. For example, the tines 82 may impact the sidewalls 84 of the Pallet 4 or the legs 6. Therefore, when systems (new and pre-existing) criteria necessitates a relatively close read range, and it is desirable to position the devices 16 in the area of a side wall 84 or the outside feet 86, it would be advantageous to affix devices 16, such as tags 18 on the lower sheet of plastic 12 away from potential areas of tine 82 impacts. Devices 16 can also be advantageously positioned on sheet 10 as may be preferred in the embodiment used, with several acceptable locations being shown. As tines 82 are introduced through pallet 4, abrasion and shear may also occur along the path traveled by the tines 82. Accordingly, locations containing devices 16 may be reinforced to absorb and protect a device chamber 88 within which the devices 16 reside. This is illustrated in FIG. 11. A variety of potential chamber designs are possible in both twin and triple sheet constructions. In twin sheet constructions, the preferred methodology is to encapsulate each device 16 between two sheets of plastic 10 and 12 in an arrangement that provides compressive, flexural, shear and anti-abrasion strength in a zone 90 contiguous to the chamber 88. A vertical side wall 92 of sheet 12 circumventing chamber 88 may incorporate vertical details 94 and/or horizontal details 96, improving the strengthening criteria. Chamber 88 is further strengthened by top sheet 10 being locally recessed or lowered in side-to-side elevation so as to position the chamber away from the load bearing surface of pallet 4 and in particular the edges of packaging and objects supported thereon.

Figure 12:
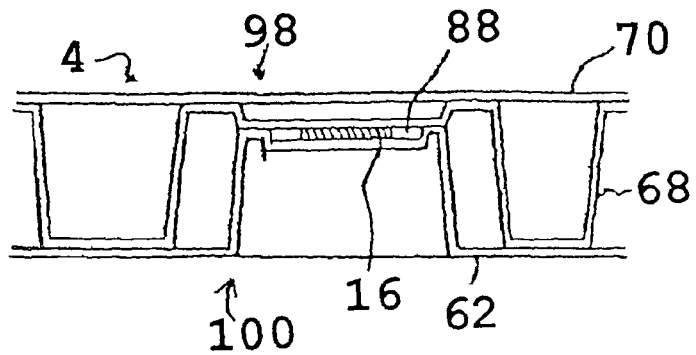

In triple sheet constructions, other pallet strengthening techniques can be used to increase the survivability of devices 16 within chamber 88. Sheets 62, 68 and 70 are formed to substantially position chamber 88 between the top load-bearing surface 98 and the bottom tine contacting surface 100 of pallet 4 so that the devices 16 are isolated from damaging events within the core of the pallet 4. This arrangement is illustrated in FIG. 12.

Figure 13:
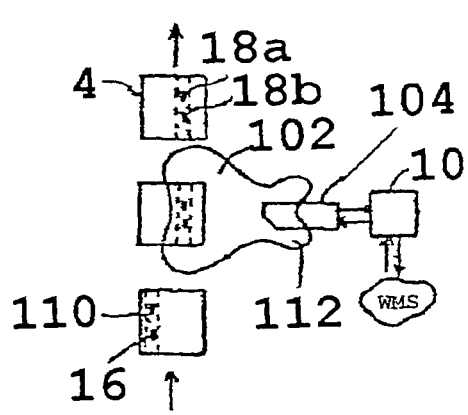
FIG. 13 is a diagrammatic view showing the interaction between an interrogator and the radio frequency device employed with the present invention pallet.

As understood in reference to FIG. 13, devices 16, and in particular tag 18b, are transported through zone 102 proximate interrogator 104. Interrogator 104 interfaces with a LAN PC 106 networked to a Warehouse Management System (hereinafter "WMS"). This creates an implementation criteria that is reliable and secure for data retrieval and storage occurring while the pallet 4 transits through zone 102. When the read/write distance capability of the interrogator 104 is limited and necessitates a predetermined orientation of pallet 4, some inconvenience may occur because the pallet 4 will have to be rotated 180°. As this is impractical within a smooth flowing WMS, two means of interventions may be taken to prevent this undesired handling. A first means is to apply color-coded polymeric strip 110 upon the plastic sheet 70 (see FIGS. 19 and 20) at the time of extrusion which corresponds to the location of the devices 16. In this manner, the pallet may be oriented by visual design for expediency. This will be discussed in further detail hereinafter.

Figure 14:
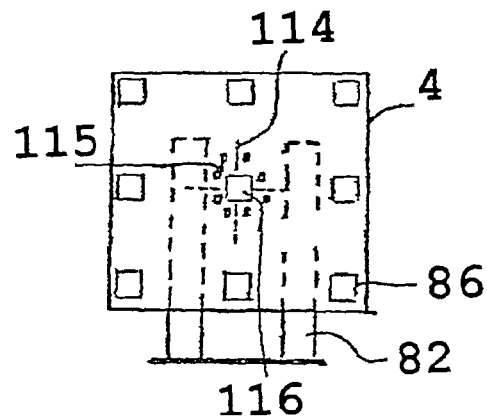
FIG. 14 is a top elevational view showing an exemplary radio frequency device orientation employed with the present invention pallet.

System interference may also occur if a nearby devises 16 travels outside the interrogation zone 102 but through the interrogator's signal pattern 112. Similarly, as the pallet 4 is traveling through the WMS, devise 16 may excite other interrogators coming within reader range. These occurrences may lead to unreliable data. In order to minimize these and other potential problems, it is preferred to encapsulate devises 16 along a center axis 114 of pallet 4. This is shown in FIG. 14. Axis 114 may progress from either the long or short side of a 48 inch by 40 inch pallet 4. Devises 16 are positioned along an axis 114, which resides in a zone 115 contiguous to the center leg 116 of the pallet 4. In this manner, the tag 18 can be interrogated from either the right or left hand side of the pallet 4.

Figure 15:
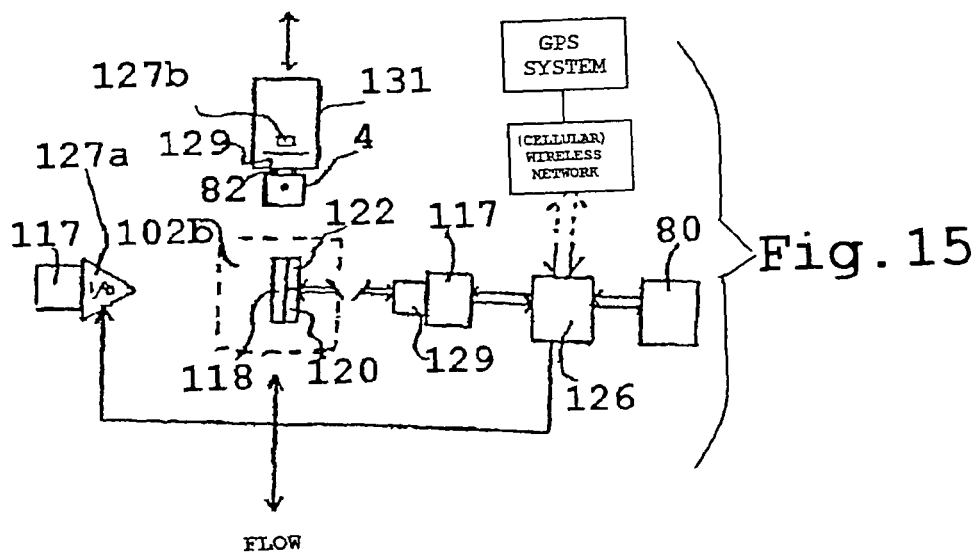
FIG. 15 is a diagrammatic view showing the interaction between the interrogator and radio frequency device employed with the present invention pallet.

Referring to FIG. 15, where a RFID system is being employed within a new setting, it is advantageous to position elements of a fixed field interrogator, such as a transit portal 117, upon, below or well above the ground along the path transited by the pallet 4. Accordingly, an over or an under bearing RF link is provided when pallet 4 travels through the interrogator field 102b. This arrangement also ensures that spaced apart metal tines 82 do not deflect interrogator signals, thus causing unreliable reads. In the preferred embodiment, elements of the interrogator that are positioned for an over or under bearing read pattern include the interrogator antenna assembly 118 and transmitter and receiver modules 120 and 122, respectively, and an interrogator data processing and control module 124, which is proximate LAN PC 126. With this arrangement, improved read capability is integral to criteria for implementation reliability and security.

It may also be understood in connection with FIG. 15, that PC 126 may communicate with read result display(s) 127a positioned proximate interrogation zone 102b in a fixed location visible to the operator controlling the movement of the pallet, or wirelessly to a display 127b on a console 129 of a motorized pallet transporting vehicle 131. In this manner, the system is integrated to facilitate economical movement of pallets 4 through interrogation portal 117 and distribution network.

In the present invention, a pallet and corresponding load of tagged objects, or stack of pallets, is positioned within the interrogation zone by a manually operated motorized pallet transporting vehicle. The interrogation field detects the vehicle within the zone by a triggering devise. The interrogator communicates with the tags in the zone, and upon completion of this task, communicates with a visual message delivery devise that is operative to instruct the driver to exit the interrogation field or pass through the portal. An LED light or the equivalent can be positioned on the drive console of the vehicle to inform the driver to stop and proceed. A stop and go light arrangement can also be positioned within the field of view of the driver to achieve the desired communication. Alternatively, the host computer receiving pallet information can interface with pallet transporting vehicle by displaying on a console where the pallet is to be stored within the warehouse.

Figure 16:
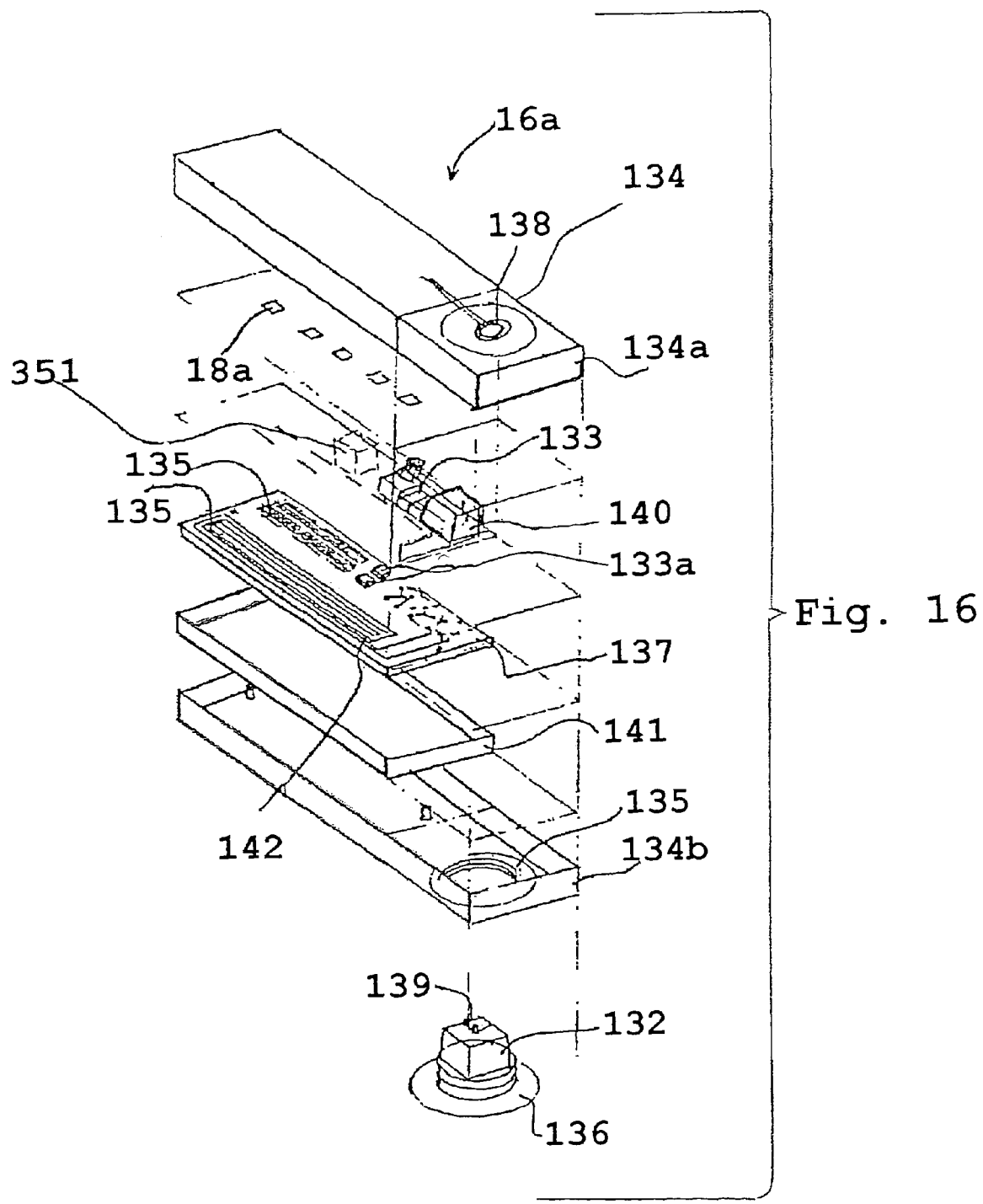
FIG. 16 is an exploded perspective view showing an interrogator incorporated into an alternate embodiment of the present invention pallet.

Reference should now be made of FIG. 16. Another feature of the present invention employs encapsulating interrogator communications device 130 between the sheets forming the pallet 4. Interrogator 130 could be adapted through system architecture to take an inventory of the tags 18 or sub-set of tags 18 residing upon the pallet 4. It should be appreciated that interrogator 130 is a substantially larger device 16a than tag 18. It may therefore be impractical to encapsulate the interrogator 130 within the pallet 4 in the process manner outlined above. In order to insert the interrogator 130 within the pallet 4, the following methodologies would be preferred.

In a twin sheet pallet construction, interrogator 130 is delivered to a selected location by means of a shuttle type delivery system that is adapted to move from a position outside the form station where apparatus loads an interrogator from a supply, to a position inside the form station, where the apparatus unloads the interrogator; it then shuttles back to load another interrogator, in between the time the first sheet 10 is thermoformed and when it is sequentially fused to thermoformed second sheet 12. The shuttle type delivery system could also be adapted to locate a plurality of devices 16a, also including tags 18, between the time the first sheet 10 is molded and the second sheet 12 is fused to the first sheet 10 in a twin sheet construction. A shuttle system of the type may alternately be substituted with a robotic arm.

It will also be appreciated that interrogator 130 will draw a considerable amount of power for operation. Interrogator 130 is therefore active, with power supplied from a battery 132. From time to time, interrogator battery 132 may be replaced according to a maintenance schedule contained in data array of one of tags 18, preferably tag 18a. As was also the case with tags 18, interrogator 130 will fail if delicate instruments 133, memory and integrated circuit chips 133a or circuitry 135 printed on a circuit board 137 are damaged during the high temperature and compression events of the thermoforming process. Intervention is thus required to insert battery-powered devise(s) 16 between sheets of plastic.

Interrogator 130 is enclosed in a heat and compression resistant thermoplastic housing 134. The housing base 134b has a flange and thread section 135. Thread section 135 accepts a thermoplastic seal and threaded plate 136. The plate 136 is removable to replace or recharge battery 132. Tags 18 may also be embedded in pallet 4 inside housing 134. Alternatively, tags 18 are manufactured or deposited upon circuit board 137 of interrogator 130. As shown battery, 132 may be mounted to plate 136 adapted to reconnect the battery as the plate is threaded to a closed position. Spring terminals 138, concentrically arranged about an axis corresponding to the rotational path of the terminals 139 on the affixed battery 132, are developed to ensure robust connection and enduring power supply. An EMI shield 141 is provided to prevent tag reading interference; otherwise multiple pallets with goods on each pallet stored on warehouse racking may demand the use of a directional antenna 142. Housing flange 135 is larger in diameter than the circuit board assembly. The circuit board assembly can be removed for maintenance, upgrading and recycling of the pallet 4. It is preferred that the housing 134 is recyclable with pallet when emptied. Other arrangements enclosing the devises in protective housings to withstand the rigors of thermoforming are also practical.

In order for the pallet interrogator 130 to communicate with a LAN PC, a Wireless Wide Area Communication System 140 is added. System 140 can be a cellular communicator inter-operating in an open standard environment. In the event FCC's E-911 mandate precludes utilizing cellular communications in this application (i.e. GPS), an alternative technology that can be used is wireless PC communications. The circuitry of a RF based interface PC card for a mobile PC devise could be deposited upon circuit board 137. A local area Ethernet communicator interfaces the PC card circuitry with a LAN PC, and through the LAN PC by the Internet to host computer(s) 80. One or more circuit board antennas 142 may be slave to several communications devises, as is battery 132.

Figure 17:
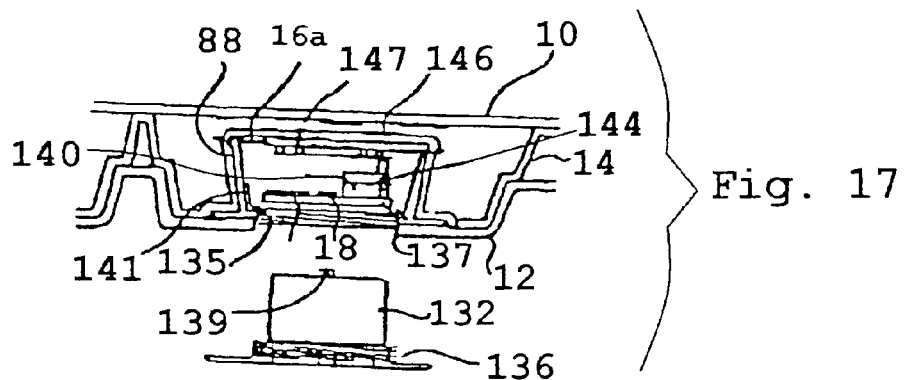
FIG. 17 is a cross sectional view showing replacement of a battery for the alternate embodiment of the present invention pallet.

In the triple sheet configuration of FIG. 17, housing 134 is contained in chamber 88 formed between plastic sheets 12 and 14. After first sheet 12 is thermoformed, a shuttle type delivery system is used to deliver housing 134 to chamber 88 such that flange 135 is selectively positioned upon first sheet 12. Concurrently, sheet 14 is thermoformed. The shuttle is extracted from the forming station, and interfacial fusion next occurs where sheets 12 and 14 are compressed together in the thermoforming operation. Housing 134 is enclosed between two sheets of plastic. Third sheet 10 is thermoformed over a third molding surface and subsequently brought into compressive contact with sheets 14 and 12. It is not necessary that sheet 10 fuse under compression with sheet 14 at the location of interrogator chamber 88. Before (die cut in mold) or after pallet 4 exits the thermoforming operation, an orifice on sheet 12, adjacent threaded section 135, is removed (by trimming) to later receive battery pack 132 affixed to plate 136. Alternatively, it may be advantageous to place housing 134 into a chamber formed by sheets 14 and 10. It may also be advantageous to chill the plate so that when the plate expands thermally, it produces a more robust closure.

The wireless interrogator is instructed to identify a plurality or sub-set of the RFID tags associated with articles supported upon the pallet. Thus, a pallet would be able to perform, for example, its own inventory check by arrangement.

Figure 24:
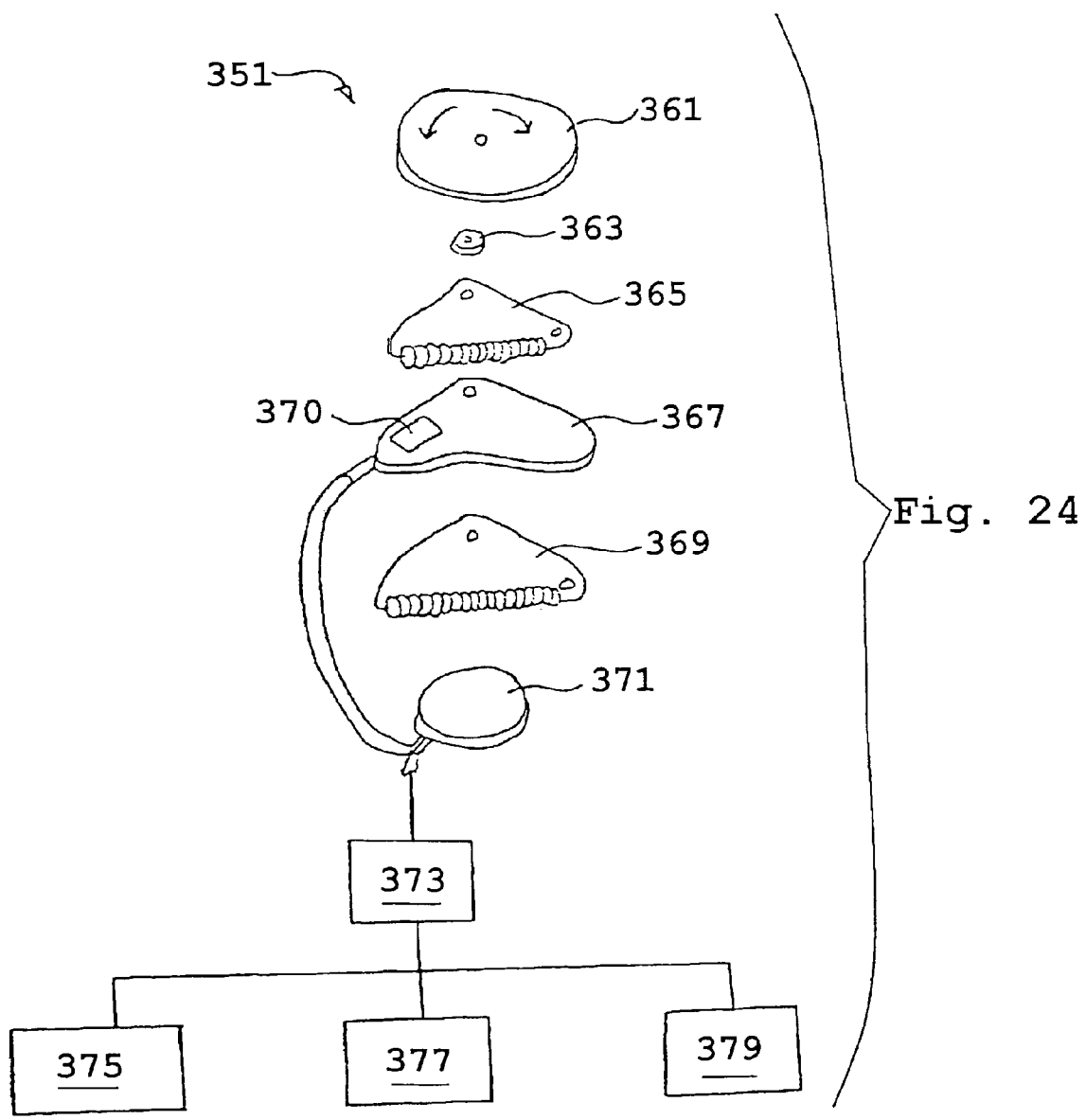
FIG. 24 is an exploded perspective view showing an alternate embodiment renewable power supply device employed in the present invention apparatus.

The present invention is further advantageous over conventional systems, such as that disclosed in U.S. Pat. No. 5,936,527, since inserting a wireless active interrogator in a plastic pallet of the present invention allows transportability and can be instructed to perform an operation anywhere or at any selected time within the wireless network. Examples of such a wireless network includes digital telephony, satellite communications, wireless Internet, microwave, cellular transmission and the like. Among other alternative embodiments of this aspect, is an optional renewable power supply devise 351 (see FIG. 16) that rectifies voltage generated by antenna coils into stored energy in a battery at the interrogator in the plastic pallet or container. This affects battery size, replacement schedules, and other problems associated with wireless active interrogators. This renewable device generates energy, which recharges the associated battery, spring or other power reservoir in response to external agitational movement of the pallet during transit. The internal mechanism for the renewable device can be made in accordance with U.S. Pat. No. 4,500,213 entitled "Ultra-flat Self Winding Watch" which issued to Grimm on Feb. 19, 1985, and is incorporated be reference herein. The internal circuitry is shown in FIG. 24 wherein the capacitor acts as the power storage reservoir. Renewable device 351, employs an oscillating weight 361, rotor 370, top generating coil block 365, circuit block 367 with an integrated circuit 370, bottom generating coil 369, capacitor/condenser 371 and battery/power source 373. Battery 373 is electrically connected to the communications device, which includes an active tag 375, and interrogator 377 and a communicator 379.

Moreover, the wireless active interrogators could also be positioned within a molded structure forming part of the plastic pallet. A battery supply information field could be part of the manufacturing memory tag or third party pallet management memory array as preventative maintenance schedule field.

Yet another advantage of the aspect of encapsulating a plurality of RFID devises within the structure of a thermoformed pallet is that the same pallet can be tracked through different networks that interface according to differing substantially proprietary protocols. There are several popular data encoding methods, at least three data modulation standards and a handful of proprietary anti-collision backscatter formats. It is unlikely that in the future, one devise will be able to interface will all deployed systems, because an open standard for interoperability has not overcome issues with respect to proprietary technologies. There is also a range of operating environments and computer operating system platforms to interface with. A combination of devises within one product that enables functionality at many locations with pre-existing system infrastructures will help propel the plastic pallet through the distribution system. Notwithstanding one tag devise with several proprietary circuits could be coupled with one or more memory chips, and one antenna coil.

According to yet another aspect of the invention, one or a plurality of RFID devises may be provided within a single plastic pallet. For example, one such tag may be dedicated to manufacturing, material and recycle information storage. One tag may be specifically adapted for pallet tracking within the distribution system. The pallet may also host a third RFID devise specified by third parties for specialized inventory tracking activities within closed-loop or associated distribution networks. A fourth tag may be developed to consolidate the data arrays of several tags transported upon the pallet for more efficient data compression and transfer. A fifth tag may be adapted for interfacing with the RFID systems deployed by the trucking industry. Accordingly, one or more RFID devises may be embedded within one pallet to facilitate one or more operations according to different implementation objectives that ultimately increase the efficiency of plastic pallets.

According to this additional preferred aspect of the present invention, one RFID devise maybe used during the manufacturing process. A relatively simple, programmable passive RFID device that provides a bi-directional interface for one-time programming and multiple readings of the memory is used. The tag on the plastic sheet is interrogated to instruct the PLC of the thermoforming machine how the sheet is to be processed. In one such example, even though the standard 48 inch by 40 inch wooden pallet is designed to carry 2,800 pounds, the GMA claims approximately 30% of the unit loads weigh less than 1,000 pounds, and 66% of unit loads weight less than 2,000 pounds. Accordingly, the preferred thermoforming method may be used to produce a select range of standard plastic pallets, that are produced using different plastic formulations and processing guidelines, to meet different distribution system needs. The machine PLC may then be instructed to communicate to the tooling to instruct the tooling how to process the successive sheets. The thermoforming machine, production tooling and sheet materials thus interface with each other to recognize, synchronize, authenticate, implement and record manufacturing results to a manufacturing biased host computer. The memory array of the proposed devise is limited to read-only data transmission and is disabled from accepting further programming or erasing instructions once the pallet is made but before the tagged pallet enters the pallet supply stream. The memory array of the manufacturing related RFID devise will contain information pertaining to manufacture date, serial number, load bearing capabilities, operating temperatures, material composition, repair instructions, expiration date, recycling requirements, ownership, ISO certificates and the like. The data contained in the array could be tailored toward the needs of a third party pallet rental/leasing company, which can schedule and perform RFID and pallet maintenance.

Figure 18:
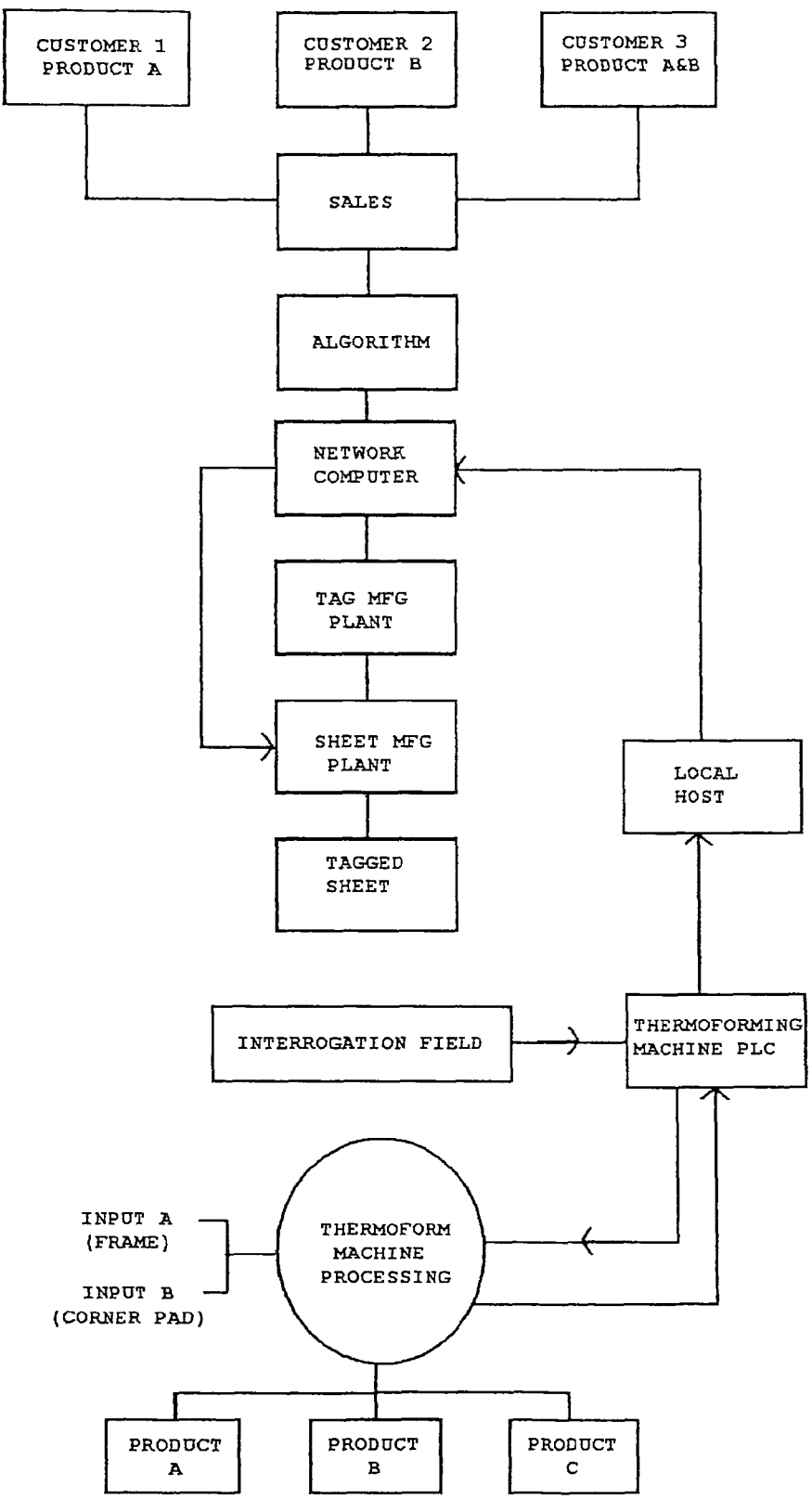
FIG. 18 is a flow chart showing another preferred embodiment of the present invention pallet.

This embodiment is explained in more detail as follows, with reference to FIG. 18. An end user customer requests a custom made final product by communicating his specifications manually to a sales office or through a remote electrical communications interface, such as the Internet. The control system computer will use predetermined algorithms and look up tables to automatically determine the optimum manufacturing criteria for these customer specifications. The determined manufacturing criteria is subsequently communicated to the tag manufacturing plant's local host computer.

The tags are sequentially deposited upon a roll at which point the tags receive selective data information which is pre-programmed or stored in the memory of each tag. The pre-formed sheets, containing the RFID tag, are subsequently conveyed to the thermoforming plant or machinery for processing into end products, shown in the figure as product A and product B.

The RFID tag on the sheet traverse and travel through the interrogation filed prior to entry of the sheet into the thermoforming machine. Data previously stored and programmed into the RFID tag memory is thereby communicated to the thermoforming machine PLC attached to the interrogator. The PLC thereby analyses the received data and adjusts the manufacturing operation and machinery as predetermined for the specific data criteria analyzed.

For example, fire retardant fillers in the plastic sheet require a longer period of time for heating in the ovens. Thus, data regarding the presence of fire retardant materials, which has been previously programmed or stored in the RFID tag memory, instructs the PLC of its presence and the PLC then controls the machinery to provide increased heat in the ovens for the specific sheet about to enter the ovens. The next sheet to be processed many not have a fire retardant filler and thus the PLC will accordingly vary the machinery and processing operation to reduce the oven heat applied to that subsequent sheet to be processed. In another example, an end product may be desired to have a metal frame inserted for increased load bearing strength. When the interrogator receives this information from the RFID tag attached to a sheet to be processed, the PLC operating the processing machinery will then instruct an auxiliary input A machine to insert a metal frame between a pair of sheets being processed. This can be done by a robotic arm or through other automation. The process is completed according to the preprogrammed manufacturing instructions in the machinery PLC, as altered or varied by data stored in the RFID tag for each sheet being processed. After completion, the PLC communicates the record of completion to a network computer for billing purposes and other statistical process control information.

Still according to this aspect of the present invention, one or more RFID devises can be used to identify, locate and track a pallet within the distribution network throughout the pallet's life cycle. In the manner, computer based tools can be utilized to increase the velocity of the pallet through the system. In other words, the pallets are managed as an asset rather than an expense. The pallet is tracked using a more complex programmable RFID device that provides a variety of operating modes (single tag/multiple tag environments), including multiple write and read (EEPROM) capabilities. Tagged pallets traverse interrogation fields distributed throughout the distribution network to record the pallet's progress through the distribution system. The RFID devises include anti-collision modulation options to resolve backscatter when multiple tags are in the same interrogation fields. Automatic pallet material handling equipment is upgraded to accommodate readers and communicators. Supply chain management and control of the movement of pallets through the distribution system are facilitated with real-time data input from the integrated RFID system. Host, interrogator and tag interface according to various implementation criteria, such as last scan time & date, movement order number field, "from" field, "to" field, shipper field, pallet rental release field, and pallet return instructions. RFID technology provides a two-way flow of information between the pallet and the system server to help propel the pallet through the distribution system. The RFID devise may also carry its own electronic manifest. A more efficient use of plastic pallets will reduce the total number of pallets required by the over all distribution system.

According to a further feature of the invention, each RFID devise that may be contained in the pallet may be developed to operate on different radio frequencies (13.56 megahertz to 2.45 gigahertz) in order to optimize system performance and minimize the cost of interrogators and tags. Each devise may use a different coding waveform algorithm to reduce data recovery errors, bandwidth problems, synchronization limitations and other system design and cost considerations. For example, the pallet manufacturer does not need interrogation systems interfacing with the tracking systems, and versa visa. Thus, a less elaborate and costly RFID system is needed by the thermoforming manufacturer to deploy RFID systems. Similar tag devise transmissions may be echeloned according to prescribed system criteria or other pallet management tools or model algorithms.

As Faraday's law and Lenz's law are well known, it is also understood that the parallel orientation, and distance between the reader and tag antenna coils in respect of each other are important for the successful operation of passive RFID devises in particular. Read range is lower in higher frequency passive RFID devises. Furthermore, it is understood that induction is maximized when the antenna coils are perpendicular to the direction of the radio frequency signal. Therefore, another feature of the present invention provides for encapsulation of RFID devises within the structure of the plastic pallet. In one embodiment, an interrogator is contained in a vertical freestanding structure off to the side of the path traveled by the RFID devise. Accordingly, the antenna coils located in the interrogator and pallet are vertically oriented in approximate parallel condition to facilitate a proper signal transmission. In another embodiment, an interrogator is placed upon or under ground along the path traveled by the pallet, or alternatively suspended from above. In such an arrangement, it is advantageous to orient the respective antenna coils substantially horizontal in an approximate parallel condition to facilitate induction. These later arrangements would be difficult to duplicate and implement with wooden pallets because water absorbed by the wood would impede or reflect the RF signal away from the tag antenna.

Figure 19:
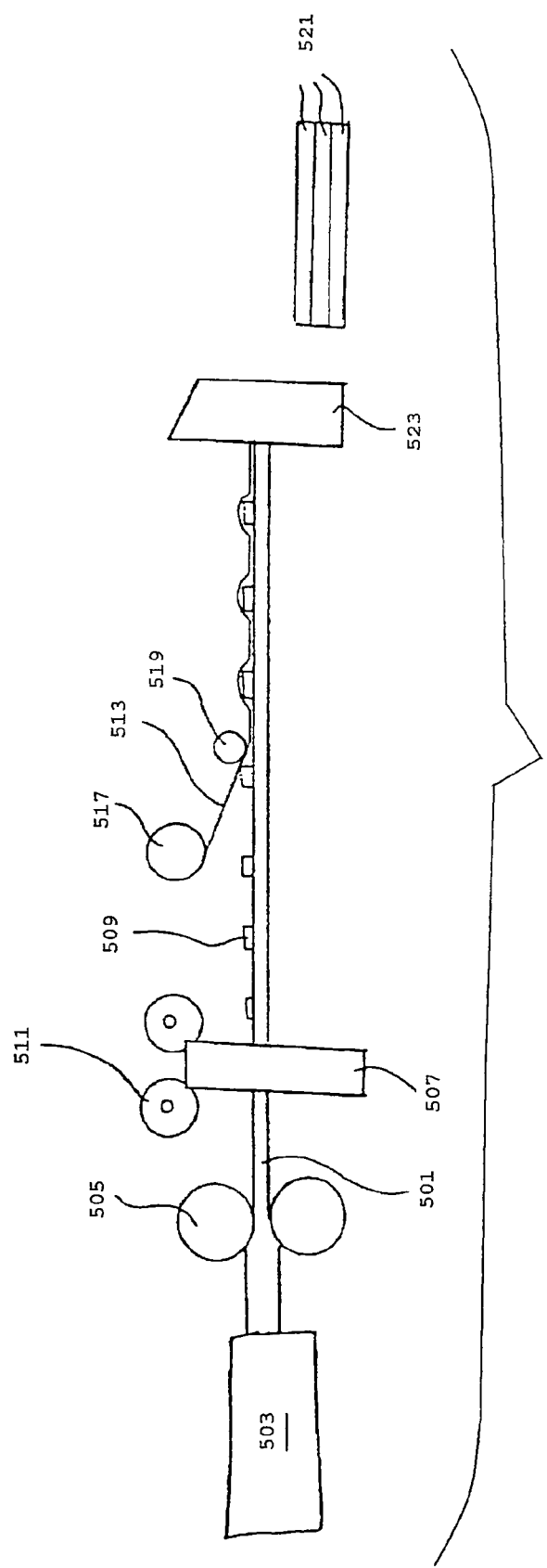
FIG. 19 is a diagrammatic view showing another preferred embodiment manufacturing process employed with the present invention pallet.

A further preferred method of attaching RFID tags to polymeric sheets is as follows, with reference to FIG. 19. A polyethylene or polypropylene sheet 501 is created by an extruder 503 and a pair of opposed rolls 505. The continuously created sheet is then fed through an indexer 507 at which point RFID tags 509 are fed from tag rolls 511 which are deposited in a spaced fashion upon an upper surface of sheet 501. A narrow roll of polyethylene or polypropylene film 513 is simultaneously unwound from a film roll 517 and then compressed by a spring biased application roller 519 upon sheet 501 and covering each tag 509. The film is thermally bonded to sheet 501 by compression of heated spring biased application roller 519. The continuous sheet 501 is subsequently sheared or cut into separate preformed sheets 521 by a shearing machine 523.

Figure 20:
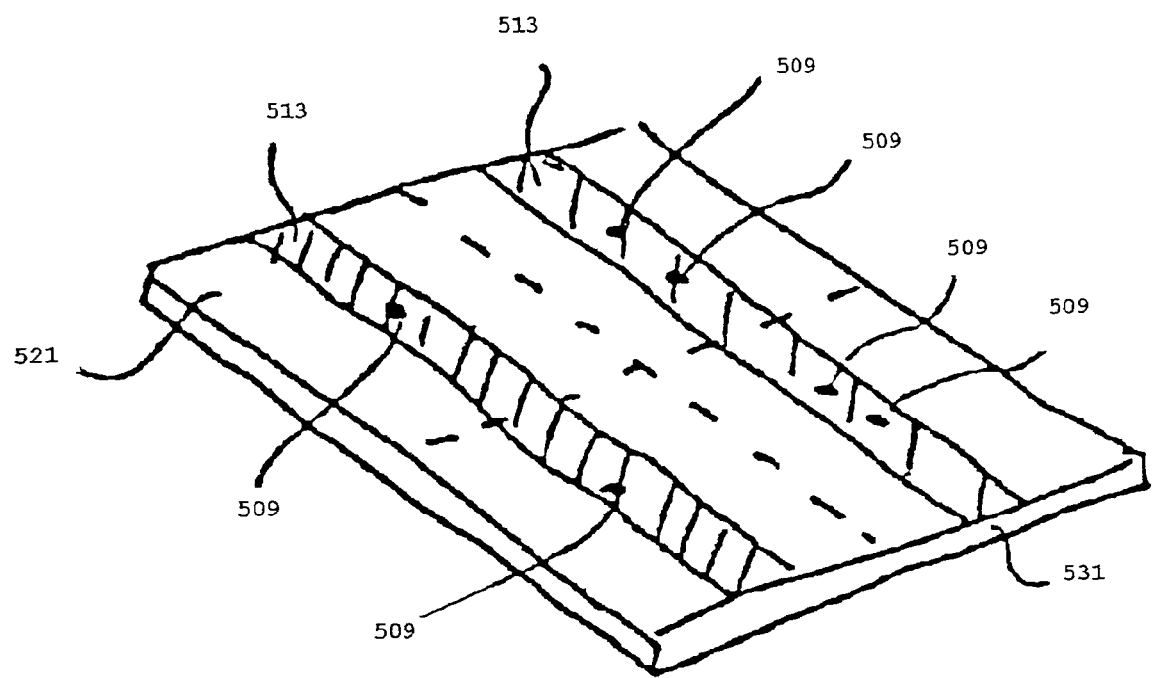
FIG. 20 is a perspective view showing the present invention pallet of FIG. 19.
Figure 21:
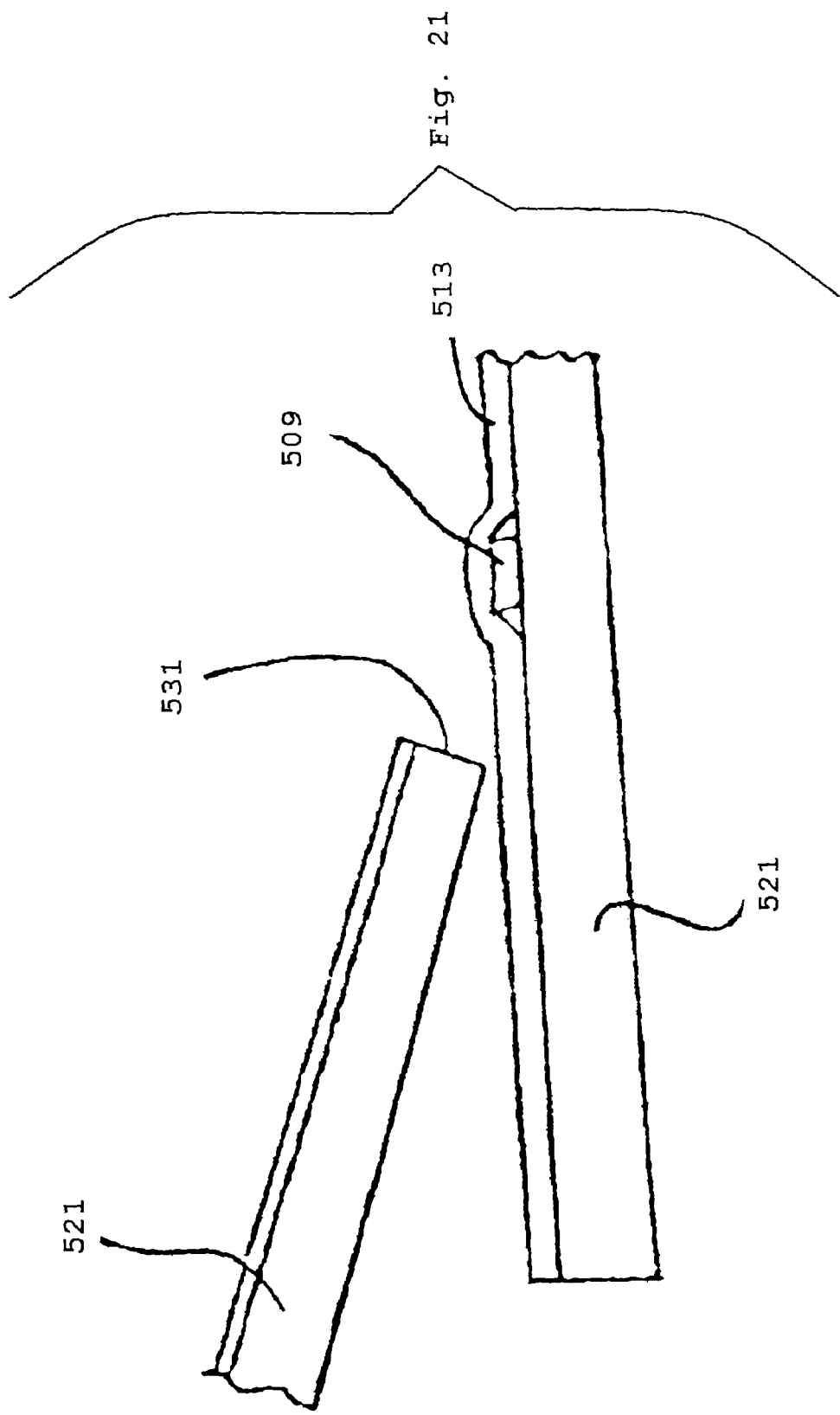
FIG. 21 is a fragmentary side elevation view showing the present invention pallet of FIG. 20.

It is alternately envisioned that the film is colored so that it can be used to indicate tag location inside of a pallet for correct orientation to provide accurate readings as previously disclosed. For example, a plurality of colored films may be applied to denote RFID tag implementation criteria. For example, FIGS. 20 and 21 show a four-up sheet wherein one operation yields four formed parts; in other words, four preformed sheets, with respective RFID tags, are not severed until after thermoforming. Film 513 is shown in two distinct and parallel, elongated locations covering RFID tags 509 upon the four-up sheet 521. Film 513 further protects the underlying tags 509 as the leading edge 531 of a subsequently severed sheet is angularly moved along a lower sheet 521 during stacking.

Figure 22:
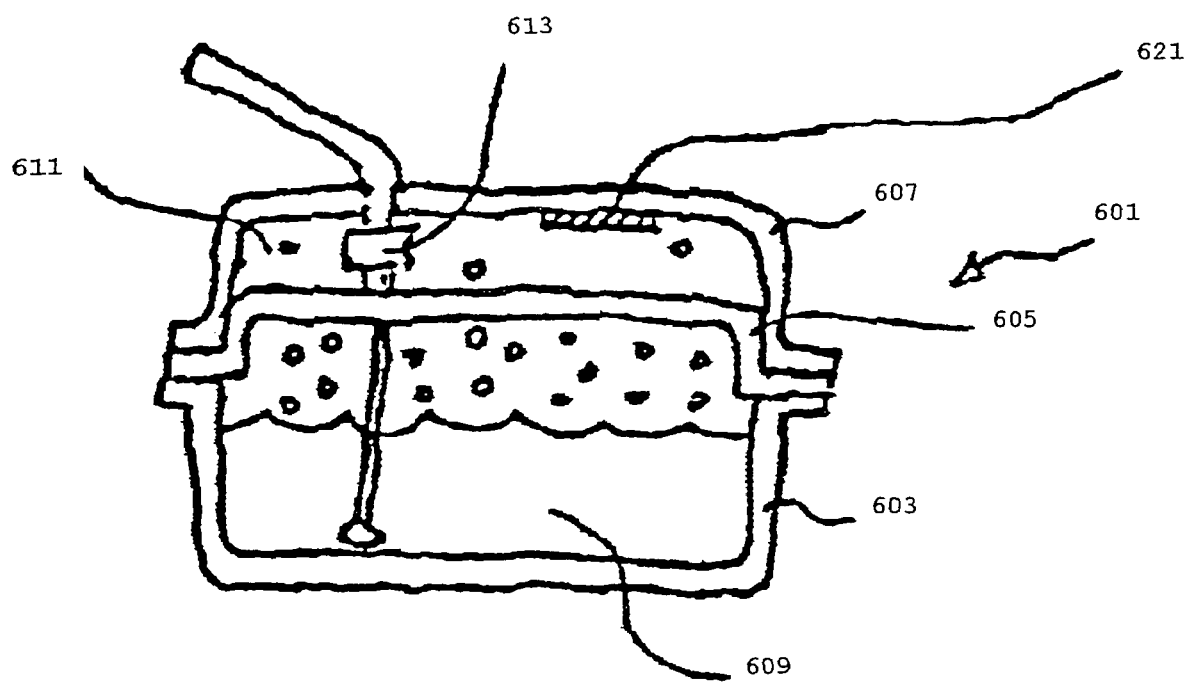
FIG. 22 is a cross-sectional view of a preferred embodiment tank container of the present invention.

Another preferred embodiment application of the thermoforming and communications device technology is shown in FIG. 22. In this embodiment, a gasoline fuel tank 601, such as those used with an automobile, motorcycle, all-terrain vehicle, airplane, boat or other motorized vehicle, is made using twin or triple sheet thermoforming. Tank 601 is made of three, three-dimensionally formed sheets of plastic, 603, 605 and 607, respectively, which are all joined together during processing. A bottom hollow section 609 operably contains a liquid, such as gasoline fuel. A top hollow section 611 contains fuel filler, filter, and other standard devices 613 necessary for the operation of tank 601.

A communications device 621 is attached to an inside surface of sheet 607 within top hollow section 611 prior to thermoforming, as was previously disclosed herein with the pallet manufacturing. As the fuel is removed for engine combustion, environmentally hazardous gases are left to fill the space unoccupied by the fuel. Top hollow section 611 acts as a reservoir that contains the harmful gases that would otherwise escape through the devices 613 into the environment. The devices 613 can also recirculate the gas back into the lower hollow sections 609, in a conventional manner. An instrument section of communications device 621 is operable to inspect and monitor the barrier performance of top hollow section 611 to ensure compliance with governmental regulations. When the vehicle is inspected, the data generated and stored by the instrument of device 621 is then conveyed through radio frequency communications to an external monitoring device operated by the governmental regulating authority for inspection purposes. The instrument section of device 621 can be battery activated in an active manner to provide regular intervals of inspection, can be passive to receive power when externally interrogated, or can be triggered one time when a predetermined threshold is met.

Figure 23:
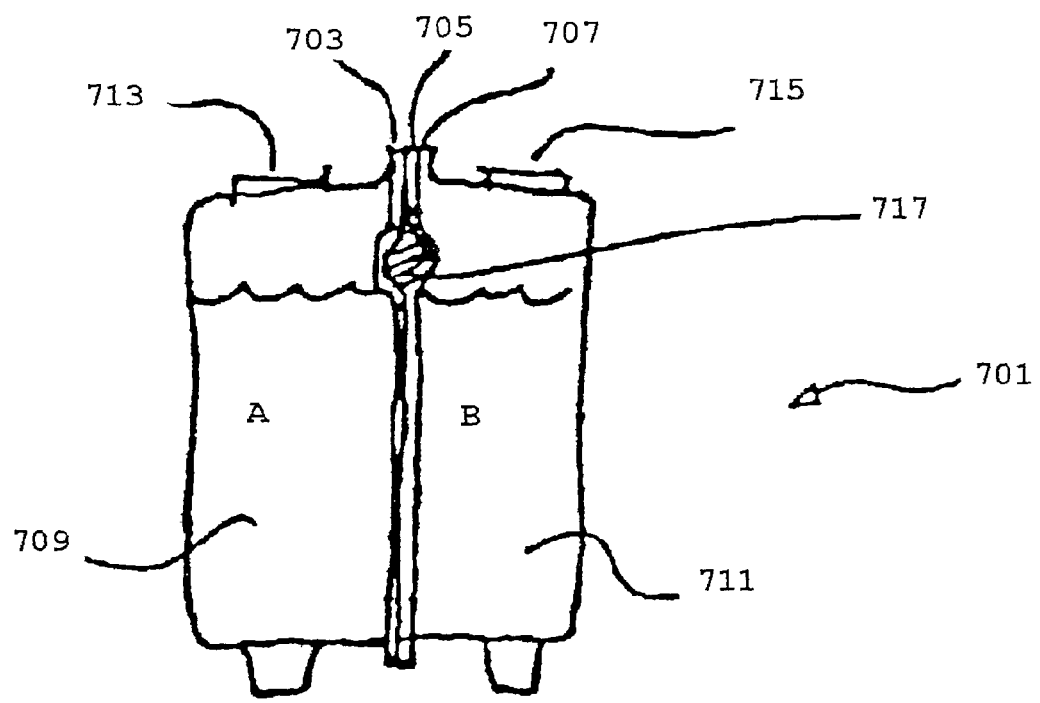
FIG. 23 is a diagrammatic view showing another preferred embodiment tank container of the present invention.

A further preferred application of the present invention is shown in FIG. 23. A bulk container 701 operably carries a hazardous material therein. For example, a two-part polyurethane container system is made from three sheets 703, 705 and 707 which are thermoformed and joined as previously disclosed herein to provide container 701 with two reservoirs 709 and 711. Flange plates 713 and 715, having threads, are formed onto container 701 to receive metering pump elements (not shown). These flange plates are made in accordance with those disclosed for battery replacement in the pallets. Pockets or receptacles 717 are created between adjacent internal sheets 703 and 705 at an overlapping margin to receive RFID tag devices. The RFID tags perform a range of functions which include recording of chemical formulas of material contained within reservoirs 709 and 711, storage of safety data for storing, clean up information, worker injury information (such as that traditionally contained on a material safety data sheet), temperatures, thermal shock, and for disposal instructions. This data can later be interrogated by and external interrogator or the like.

While the preferred embodiment of the thermoformed pallet having a radio frequency device has been disclosed, it should be appreciated that other variations may be employed. For example, with a shuttle type delivery system and methodology, the gantry and laminator apparatus are not required. There are several other methodologies that may be used to practice the useful purposes of embedding sophisticated communications and other technological devices within the structure of a plastic pallet 2. Furthermore, analog or solid state circuitry can be employed instead of the microprocessors, integrated circuits and computers disclosed. There are a number of different reinforcing structures that can be molded into two or more sheets of plastic to reinforce the area around the devices 16. It is not necessary to form a complete chamber in plastic, so long as device 16 remains in the areas developed to protect the device from thermoforming shock, and operating wear and tear. It is also understood that access to the devices may be from the top or bottom in the wide variety of pallets contemplated in the present methodology. Furthermore, the RFID tags can also be attached to other heat and pressure formable sheets, such as cardboard, fiberglass, or the like, prior to three dimensional forming of the sheets. Additionally, the RFID tags and other electrical communications devices can be employed to monitor food conditions within a food container. While various materials have been disclosed, it should be appreciated that other materials can be employed. It is intended by the following claims to cover these and any other departures from the disclosed embodiments which fall within the true spirit of this invention.

I claim:
1. A system comprising:
a manufacturing machine,
a receiver,
an electrical control system connected to said machine and said receiver,
an extruded sheet with at least one data storage device affixed thereto with said sheet being manufactured by said machine into an article, and
said receiver operably interfacing with said data storage device to ascertain data previously stored on said device and said control system changing manufacturing characteristics of said machine based upon data received from the device.
2. A system as set forth in claim 1 in which:
the data is ascertained by said receiver from said data storage device prior to the manufacture of the article containing said device by said machine.
3. A system as set forth in claim 1 which includes:
a transceiver spaced apart from said receiver with said transceiver being operable to send new storable data to said data storage device affixed to the article after being manufactured by said machine.
4. A system as set forth in claim 3 in which:
the new storable data is subsequently ascertained by a second receiver spaced apart from said transceiver.
5. A system comprising:
a thermoforming apparatus for shaping extruded sheet into articles,
a receiver associated with the thermoforming apparatus operable to send and receive radio frequency signals,
an electronic control system connecting to said thermoforming apparatus and said receiver for receiving and processing data contained in the radio frequency signals,
an extruded sheet with at least one data storage device affixed thereto with said extruded sheet being thermoformed by said thermoforming apparatus into an article,
said receiver operably interfacing with said data storage device using radio frequency signals to obtain shaping instructions stored on said data storage device and said electronic control system changing shaping characteristics of said thermoforming apparatus based upon instructions received from the device.
6. A system as set forth in claim 5 in which:
said receiver ascertains the instructions using an activation signal,
said data storage device immediately replies in response to the activation signal, and
said thermoforming apparatus shapes the extruded sheet into the articles in response to the reply to the activation signal.
7. A system as set forth in claim 5 which includes:
said receiver being mounted on the thermoforming apparatus, and
said electronic control system stores received and processed shaping instructions in a structured format and said electronic control system connecting to a managing network for controlling said thermoforming apparatus using the instructions.
8. A system as set forth in claim 7 which includes:
said receiver sending new storable information to an additional receiver being spaced apart from said first receiver, and
said additional receiver ascertaining the new storable information from the electronic control system and the managing network and combining the new storable information with the instructions indicating the control data for the article.
9. A system as set forth in claim 5 in which includes:
said extruded sheet having a plurality of data storage devices affixed thereto with at least one data storage device including previously stored data and at least one data storage device for receiving new stored data, and
at least one data storage device transmitting information concerning a condition or triggering event that would influence the shaping of said extruded sheet into an article by said thermoforming apparatus.
10. A system as set forth in claim 5 in which:
said data storage devices include& data selected from the group consisting of a manufacture date, serial numbers, load bearing capabilities, operating temperatures, material compositions, repair instructions, an expiration date, recycling requirements, ownership, ISO certificates, last scan time and date, movement order number field, from field, to field, shipper field, pallet release rental field, pallet return instructions, battery information field and preventative maintenance schedule field.
11. A system as set forth in claim 5 in which:
said electronic control system includes a device for managing operation of the thermoforming apparatus selected from the group consisting of programmable logic controller (PLC) and a separately controllable machine component.
12. An apparatus for shaping extruded plastic materials comprising:
a machine frame having at least four stages including a first stage for admitting the plastic materials, a second stage for heating the plastic materials, a third stage for shaping the plastic materials, and a fourth stage for holding exiting articles,
a receiver for communicating with RF devices positioned within said machine frame stages,
said receiver having a plurality of interrogation zones comprising reader/writers for receiving and transmitting data to and from the RF devices,
a control system connected to a network for managing operations of the apparatus, for processing data communicated within the interrogation zones, for receiving condition information about the plastic materials, and for obtaining heating and shaping instructions for the intended articles, and means for storing the information and changing the apparatus shaping influences to produce said intended articles.

13. An apparatus as set forth in claim 12 which includes: means for storing information being in the reader/writer, the control system, and the network.

14. A thermoforming apparatus as set forth in claim 13 in which:
said reader/writer communicatively coupling with the RF device at said machine frame third stage.

15. A thermoforming apparatus as set forth in claim 12 in which:
said RF device is resistant to thermoforming influences.

16. A thermoforming apparatus as set forth in claim 12 in which:
said receiver includes at least one antenna assembly, a transmitter module, a receiver module, and a data processing and control module connected to a local PC.

17. A thermoforming apparatus as set forth in claim 12 in which:
said receiver is distributed in the first, second, third and fourth stages.

18. A thermoforming apparatus as set forth in claim 12 in which:
said machine frame passes an RF device associated with said materials through said stages with the RF device remaining communicatively coupled with said receiver at the plurality of interrogation zones.

19. A thermoforming apparatus as set forth in claim 12 which includes:
a plurality of integrated programmable logic controllers (PLC) for executing instructions received from said receiver and said control system at each stage.

20. A thermoforming apparatus of claim 19 in which:
said PLCs control the communication of information within said interrogation zones based upon rules stored within said reader/writer, said control system, and said network, and
said PLCs control information including an input, an output, a state, and a status parameter of at least one of the plastic materials, the articles, and the apparatus.

21. A thermoforming apparatus as set forth in claim 12 which includes:
said machine frame admitting, heating, and shaping a plurality of plastic materials at once, and
said control system being responsive to the information obtained from at least one RF device relating to the admitting, heating, and shaping of said plurality of plastic materials.

22. A thermoforming apparatus as set forth in claim 21 in which:
said machine frame receives a first RF device corresponding to a first material for forming into a shaped article having information for managing operations of the apparatus and a second RF device corresponding to a second material having custom information for secondary managing and processing operations.

23. A thermoforming apparatus as set forth in claim 22 in which:
said machine frame receives the second RF device having custom information, including data concerning a unique processing property of the plastic materials, a rigidifying structure for placement in the assembled article, an RF device to be used, and a housing with parts for further sub-assembly into the article.

24. A thermoforming apparatus as set forth in claim 12 in which:
said control system integrates with a LAN PC that connects with a host that is connected to the network that stores condition information concerning the apparatus, the plastic materials, the articles, and the RF devices.

25. A system comprising:
an extruded sheet being sized for shaping a plurality of articles with a plurality of attached RFID tags pre-positioned for each article,
a thermoforming apparatus having a receiver for communicating with the RFID tags, and
said receiver having a reader/writer communicating with at least one RFID tag to obtain instructions before the extruded sheet is shaped into said articles, said instructions including processing information for the articles to be shaped by the thermoforming apparatus.

26. A system as set forth in claim 25 which includes:
said receiver communicating with at least a sub-set of the RFID tags after said extruded sheet is shaped by said thermoforming apparatus, so that said receiver provides data for storage in the memory of the sub-set of the RFID tags.

27. A system as set forth in claim 25 in which:
said extruded sheet having a plurality of tags within the space sized for each article, such that the articles include one or more RFID tags.

28. A system as set forth in claim 25 in which:
one of said RFID tags communicates with said thermoforming apparatus to provide processing information.

29. A system as set forth in claim 25 in which:
said receiver includes at least one RF transceiver for sending query signals to a RFID tag with the expectation of an immediate reply, and
a RF receiver for the reply signals from said RFID tag.

30. A system as set forth in claim 29 which includes:
said RF transceivers and said RF receivers being distributed in the thermoforming apparatus so that the RFID tags are within range of the read/writer while residing in the apparatus.

31. A system as set forth in claim 25 in which:
said extruded sheets form articles having memory for storing data that includes information from the RFID tag containing the instructions.

32. A system for making a twin sheet article with an attached RFID tag comprising:
a thermoforming apparatus having a machine frame with a plurality of defined processing stations for shaping the twin sheet article and means for communicating with the RFID tag distributed within said processing stations,
a receiver having a reader/writer,
a first extruded sheet with an attached RFID tag containing shaping information,
a second extruded sheet for forming into the twin sheet article,
a control module for processing data obtained from the attached RFID tag,
at least one programmable logic controller (PLC) linked to said control module for managing components within the processing stations, and
said PLC being responsive to the data to control the operation of said thermoforming apparatus.

33. A system as set forth in claim 32 which includes:
said second extruded sheet being different than said first extruded sheet with the RFID tag having processing information unique to said second extruded sheet.

34. A system as set forth in claim 32 which includes:
at least one of said processing stations having means for incorporating a second RFID tag into the twin sheet article responsive to data obtained from the first RFID tag.

35. A system as set forth in claim 34 which includes:
said reader/writer communicating with the second RFID tag after the first extruded sheet and second extruded sheet are shaped into the twin sheet article.

36. A system as set forth in claim 35 in which:
the second RFID tag receives communications from the reader/writer that include information indicative of the processed data received from the first RFID tag.

* * * * *